(12) United States Patent
Higuchi et al.

(10) Patent No.: US 8,809,438 B2
(45) Date of Patent: Aug. 19, 2014

(54) UV-SHIELDING COATING COMPOSITION AND COATED ARTICLE

(75) Inventors: Koichi Higuchi, Annaka (JP); Masaaki Yamaya, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 772 days.

(21) Appl. No.: 12/754,933

(22) Filed: Apr. 6, 2010

(65) Prior Publication Data

US 2010/0261022 A1 Oct. 14, 2010

(30) Foreign Application Priority Data

Apr. 9, 2009 (JP) ................................ 2009-095169
Mar. 9, 2010 (JP) ................................ 2010-051511

(51) Int. Cl.
- *C08K 3/22* (2006.01)
- *C09D 143/04* (2006.01)
- *C09D 5/32* (2006.01)
- *C08K 9/06* (2006.01)

(52) U.S. Cl.
USPC ........... 524/432; 524/556; 524/560; 524/547; 524/588; 524/858; 252/588; 252/589; 428/446; 428/447; 428/220; 428/319.3; 977/773

(58) Field of Classification Search
USPC ........... 252/589, 588; 977/773; 428/446, 447, 428/220, 319.3; 524/547, 858, 556, 560, 524/432, 588; 430/281.1
See application file for complete search history.

(56) References Cited

U.S. PATENT DOCUMENTS

| | | |
|---|---|---|
| 4,027,073 A | 5/1977 | Clark |
| 4,353,959 A | 10/1982 | Olson et al. |
| 4,668,452 A | 5/1987 | Watanabe et al. |
| 5,021,266 A | 6/1991 | Yamaya et al. |
| 5,250,359 A | 10/1993 | Funaki et al. |
| 5,844,060 A | 12/1998 | Furuya et al. |
| 6,214,416 B1 | 4/2001 | Sakagami et al. |
| 6,676,740 B2 | 1/2004 | Matsumura et al. |
| 6,855,768 B2 | 2/2005 | Matsumura et al. |
| 2002/0051889 A1* | 5/2002 | Kanamori et al. ............. 428/447 |
| 2006/0167138 A1* | 7/2006 | Ishii et al. ..................... 523/200 |
| 2007/0219298 A1 | 9/2007 | Higuchi et al. |
| 2008/0096029 A1 | 4/2008 | Higuchi et al. |

FOREIGN PATENT DOCUMENTS

| | | |
|---|---|---|
| EP | 2 072 553 A2 | 6/2009 |
| EP | 2 072 583 A2 | 6/2009 |
| JP | 51-2736 | 1/1976 |

(Continued)

OTHER PUBLICATIONS

JP 2003292818 A, Oct. 2003, Ishii et al., Machine translation.*

(Continued)

*Primary Examiner* — Satya Sastri
(74) *Attorney, Agent, or Firm* — Oblon, Spivak, McClelland, Maier & Neustadt, L.L.P.

(57) ABSTRACT

A UV-shielding coating composition comprises (A) a dispersion in a dispersing medium of composite zinc oxide nanoparticles which are obtained by coating surfaces of zinc oxide nanoparticles with an oxide or hydroxide of Al, Si, Zr and Sn, the dispersion having a photocatalytic degradability of up to 25%, (B) a vinyl copolymer obtained from copolymerization of an alkoxysilyl-containing vinyl monomer, a UV-absorbing vinyl monomer, and another monomer, and (C) a solvent. The composition is transparent to visible light, UV-shielding, mar resistant, weatherable, and durable.

12 Claims, 1 Drawing Sheet

(56) References Cited

FOREIGN PATENT DOCUMENTS

| | | |
|---|---|---|
| JP | 56-92059 | 7/1981 |
| JP | 61-56187 | 3/1986 |
| JP | 1-149878 | 6/1989 |
| JP | 8-151415 | 6/1996 |
| JP | 9-71654 | 3/1997 |
| JP | 11-209695 | 8/1999 |
| JP | 11-278838 | 10/1999 |
| JP | 3102696 | 8/2000 |
| JP | 2001-47574 | 2/2001 |
| JP | 2001-114841 | 4/2001 |
| JP | 2001-214122 | 8/2001 |
| JP | 2002-60687 | 2/2002 |
| JP | 2002-87817 | 3/2002 |
| JP | 2002087817 A * | 3/2002 |
| JP | 3319326 | 6/2002 |
| JP | 3347097 | 9/2002 |
| JP | 2003292818 A * | 10/2003 |
| JP | 3509749 | 1/2004 |
| JP | 3846545 | 9/2006 |
| JP | 2007-231060 | 9/2007 |
| JP | 2008-120986 | 5/2008 |

OTHER PUBLICATIONS

JP 2002087817 A, Mar. 2002, Derwent Ab.*

JP 2002087817 A, Iljima et al., Mar. 2002, Machine translation.*

* cited by examiner

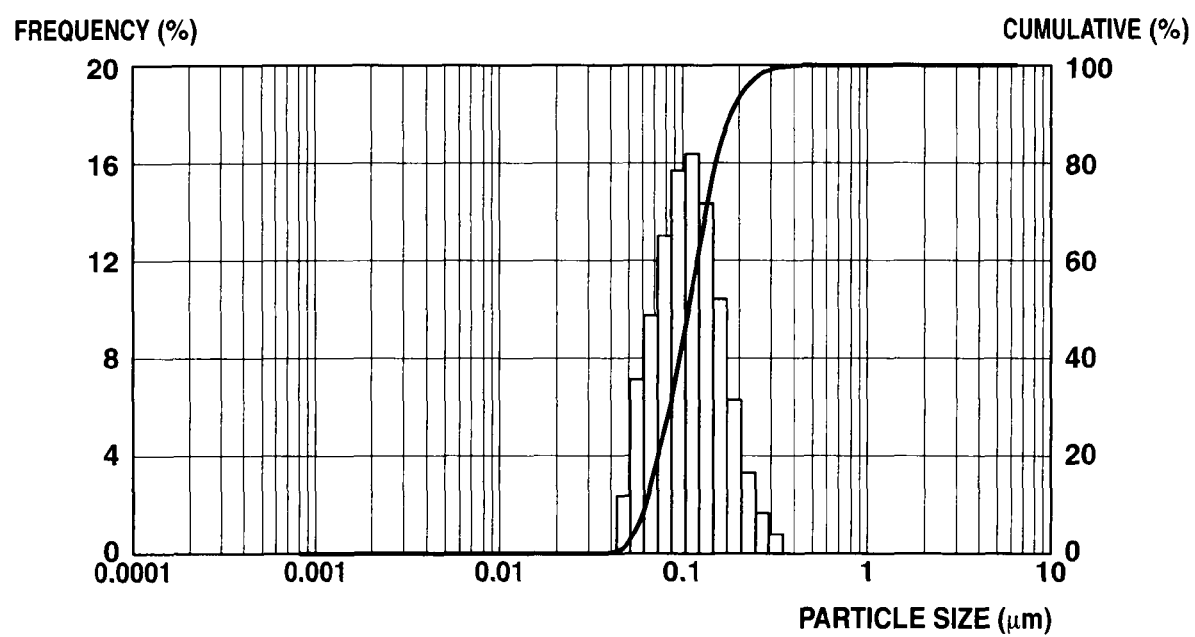

UV-SHIELDING COATING COMPOSITION AND COATED ARTICLE

CROSS-REFERENCE TO RELATED APPLICATION

This non-provisional application claims priority under 35 U.S.C. §119(a) on Patent Application Nos. 2009-095169 and 2010-051511 filed in Japan on Apr. 9, 2009 and Mar. 9, 2010, respectively, the entire contents of which are hereby incorporated by reference.

TECHNICAL FIELD

This invention relates to a UV-shielding coating composition and a coated article using the same. More particularly, it relates to a UV-shielding coating composition which is coated onto a plastic or organic resin substrate and heat cured to form a film having visible light transparency, UV-shielding and long-term weatherability, and a coated article using the same. It also relates to a coated article comprising a cured film of the coating composition and a silicon base hard coating thereon, exhibiting mar resistance as well.

BACKGROUND ART

As a substitute for transparent flat glass, transparent materials having non-shattering nature or greater shatter resistance than glass have been widely used in these years. For example, plastic substrates, especially polycarbonate resins, due to their excellent properties including transparency, impact resistance, and heat resistance, are currently used as structural members in place of glass, in various applications including windows in buildings and vehicles, meter covers and the like.

However, it is strongly desired to improve the surface properties of molded polycarbonate resins because their surface properties like mar resistance and weatherability are poor as compared with glass. Nowadays, polycarbonate resins intended for use as vehicle windows, road noise barriers or the like are desired to withstand weathering over ten years.

Known means for improving the weatherability of molded polycarbonate resins include lamination of an acrylic resin film having good weatherability to the surface of polycarbonate resin substrates, and provision of a UV absorber-containing resin layer on the polycarbonate resin surface by coextrusion or the like.

Also, known means for improving the mar resistance of molded polycarbonate resins include coating of thermosetting resins such as polyorganosiloxane and melamine resins and coating of polyfunctional acrylic photo-curable resins.

Further, a method of producing a transparent part having both weatherability and mar resistance is disclosed in JP-A S56-92059 and JP-A H01-149878. UV-absorbing transparent articles are known comprising a resin substrate, an undercoat layer having a large loading of UV absorber added, and a protective coating of a colloidal silica-laden polysiloxane coating composition formed on the undercoat layer.

However, the heavy loading of UV absorber into the undercoat layer gives rise to several problems. The heavy loading can adversely affect the adhesion of the undercoat layer to the underlying substrate or the overlying protective coating of a colloidal silica-laden polysiloxane coating composition. The UV absorber will escape from the undercoat composition via volatilization during heat curing step. On outdoor use over a long period of time, the UV absorber will gradually bleed out, exerting detrimental effects like cracking and whitening or yellowing. It is unacceptable from the standpoint of mar resistance to add a large amount of UV absorber to the colloidal silica-laden polysiloxane coating composition of which the overlying protective coating is made.

It is known from JP-A H08-151415 to form a protective coating on the surface of a synthetic resin or the like using a mixture of a benzotriazole or benzophenone-derived UV-absorbing vinyl monomer and a vinyl monomer copolymerizable therewith as a coating component. This protective coating, however, has only limited mar resistance since it is made of a vinyl polymer.

It is also known to form a coating on a resin substrate to produce a multilayer resin article using a copolymer of a benzotriazole or benzophenone-derived UV-absorbing vinyl monomer, an alkoxysilyl-containing vinyl monomer, and a vinyl monomer copolymerizable therewith as a coating component, the coating having adhesion to the resin substrate and imparting weatherability to the article. See JP-A 2001-114841, JP 3102696, JP-A 2001-214122, JP-A 2001-047574, JP-A 2007-231060, and JP-A 2008-120986.

In these patent documents, coated articles having mar resistance and weatherability are manufactured by using a copolymer-containing composition to form an undercoat, and forming a colloidal silica-laden polysiloxane resin coating on the undercoat. These articles are noticeably improved in the adhesion of the polysiloxane resin coating and weatherability. Since the crosslinking network formation of alkoxysilyl groups in the undercoat does not proceed to a full extent, post-crosslinking of residual (or uncured) alkoxysilyl or hydroxysilyl groups can occur with the passage of time, inviting a likelihood of introducing strain to the coating and thus causing defects like cracks and delamination. That is, the coated articles are still insufficient in long-term weathering. In addition, when the coating is exposed to rapid changes of the ambient temperature, especially changes at relatively high temperature, the likelihood of crack occurrence by post-crosslinking is increased.

It is also known to use zinc or titanium oxide nanoparticles as the metal oxide nanoparticles having UV shielding property (see JP 3319326, JP 3846545, JP-A H11-209695, JP 3347097, and JP-A 2002-60687). However, on account of residual photocatalytic activity, a coating loaded with such metal oxide nanoparticles can not avoid a phenomenon that the coating develops cracks or peels in a weathering test.

JP 3509749 and JP-A 2002-87817 disclose an attempt to suppress photocatalytic activity by coating surfaces of zinc or titanium oxide nanoparticles with another oxide. A coating loaded with surface-coated zinc oxide nanoparticles has a longer lifetime in a weathering test than bare zinc oxide nanoparticles. However, the coating is still insufficient as outdoor UV shielding members partly because cracks develop in a long-term weathering test.

In general, visible light transparency is one of important properties of coating compositions for forming weather resistant surface protective coatings. If metal oxide nanoparticles are used as the UV shielding agent, visible light transparency is substantially impaired depending on an average particle size and a tendency to agglomerate. JP-A H11-278838 discloses that when zinc oxide nanoparticles are prepared by a specific method, a dispersion thereof has a smaller particle size and is unsusceptible to agglomeration. A coating composition having this zinc oxide nanoparticle dispersion compounded therein would be highly transparent to visible light although this is not described in Examples.

As discussed above, a number of attempts have been made to improve the weather resistance, mar resistance and other properties of coating compositions. However, there is not available a coating composition whose cured film exhibits mar resistance, UV shielding property, and sufficient weather resistance and durability to withstand prolonged outdoor exposure while maintaining visible light transparency.

CITATION LIST

Patent Document 1: JP-A S56-92059
Patent Document 2: JP-A H01-149878
Patent Document 3: JP-A H08-151415
Patent Document 4: JP-A 2001-114841
Patent Document 5: JP 3102696
Patent Document 6: JP-A 2001-214122
Patent Document 7: JP-A 2001-047574
Patent Document 8: JP-A 2007-231060
Patent Document 9: JP-A 2008-120986
Patent Document 10: JP 3319326
Patent Document 11: JP 3846545
Patent Document 12: JP-A H11-209695
Patent Document 13: JP 3347097
Patent Document 14: JP-A 2002-060687
Patent Document 15: JP 3509749
Patent Document 16: JP-A 2002-087817
Patent Document 17: JP-A H11-278838

DISCLOSURE OF INVENTION

An object of the invention is to provide a coating composition whose cured film maintains visible light transparency, has mar resistance and UV shielding property, and also has sufficient weather resistance and durability to withstand prolonged outdoor exposure. Another object is to provide an article coated with the composition.

The invention pertains to a coating composition comprising a resin and zinc oxide nanoparticles as a UV-shielding agent. The inventors have found that when a dispersion of composite zinc oxide nanoparticles obtained by coating zinc oxide nanoparticles with a specific coating so as to suppress photocatalytic activity to a substantial extent is compounded in the coating composition, the cured film exhibits adhesion, mar resistance and UV shielding property, maintains visible light transparency, and offers weather resistance and crack resistance against prolonged outdoor exposure which could not be achieved in the prior art. Specifically, the UV-shielding coating composition comprises (A) a dispersion in a dispersing medium of composite zinc oxide nanoparticles which are obtained by coating surfaces of zinc oxide nanoparticles with at least one member selected from the group consisting of oxides and hydroxides of Al, Si, Zr and Sn, said dispersion having a photocatalytic degradability of up to 25%, wherein the photocatalytic degradability (PD) is determined by adding the dispersion to a methylene blue solution, irradiating black light to the methylene blue solution for 12 hours, measuring the absorbance of the solution at 653 nm before and after the black light irradiation, and calculating according to the following formula:

$$PD(\%)=[(A0-A)/A0]\times 100$$

wherein A0 is the initial absorbance and A is the absorbance after the black light irradiation, (B) a vinyl copolymer obtained from copolymerization of (b-1) 1 to 50% by weight of an alkoxysilyl-containing vinyl monomer, (b-2) 5 to 40% by weight of a UV-absorbing vinyl monomer, and (b-3) 10 to 94% by weight of another monomer copolymerizable therewith, and (C) a solvent, the solids content of composite zinc oxide nanoparticle dispersion (A) being 1 to 50% by weight based on the solids content of vinyl copolymer (B).

More particularly, the inventors have found the following. A coating composition comprising (A) a dispersion of (optionally surface-coated) composite zinc oxide nanoparticles, (B) a vinyl copolymer having alkoxysilyl and organic UV-absorbing groups attached on side chains, and (C) a solvent is coated and cured into a cured film which has a lower coefficient of linear expansion than prior art coating films. In the film, alkoxysilyl groups in vinyl copolymer (B) and/or SiOH groups resulting from hydrolysis thereof form siloxane crosslinks together, and alkoxysilyl groups in vinyl copolymer (B) and/or SiOH groups resulting from hydrolysis thereof form crosslinks with surface OH groups on the (optionally surface-coated) composite zinc oxide nanoparticles in dispersion (A). These crosslinks form a dense three-dimensional crosslink network, which contributes to a low coefficient of linear expansion, together with the low expansion of the (optionally surface-coated) composite zinc oxide nanoparticles themselves. Further when a polysiloxane base hard resin coating is laid on this coating film which serves as a primer, the resulting coating system is resistant to cracking and delamination over a long period of time.

The vinyl copolymer (B) has organic UV-absorbing groups attached to side chains which are crosslinked within the film of the coating composition. That is, UV-absorbing groups are anchored within the film to control a propensity of UV-absorbing groups to migrate toward the film surface. This obviates a whitening phenomenon of outer appearance and a loss of adhesion, prevents dissolution or leaching of UV-absorbing groups in water or solvent, minimizes a reduction with time of the UV-absorbing effect, and prevents volatilization of UV-absorbing groups from the film during heat curing treatment at high temperature. In addition, the (optionally surface-coated) composite zinc oxide nanoparticles in dispersion (A) have effective UV shielding property. The synergy of the composite zinc oxide nanoparticles in dispersion (A) with the vinyl copolymer (B) provides outstanding UV resistance which has not been available in the prior art.

When an organopolysiloxane base hard protective coating layer is laid on a primer layer of the coating composition, alkoxysilyl groups in vinyl copolymer (B) and/or SiOH groups resulting from hydrolysis thereof and OH groups pendant from surfaces of (optionally surface-coated) composite zinc oxide nanoparticles in dispersion (A) offer reactivity with the organopolysiloxane base hard protective coating layer, contributing to adhesion. Also the alkoxysilyl groups and/or SiOH groups resulting from hydrolysis thereof form crosslinks, contributing to heat resistance as well as mar resistance and weatherability. The present invention is predicated on these findings.

In one aspect, the invention provides a UV-shielding coating composition comprising (A) a dispersion in a dispersing medium of composite zinc oxide nanoparticles which are obtained by coating surfaces of zinc oxide nanoparticles with at least one member selected from the group consisting of oxides and hydroxides of Al, Si, Zr and Sn, said dispersion having a photocatalytic degradability of up to 25%, wherein the photocatalytic degradability (PD) is determined by adding the dispersion to a methylene blue solution, irradiating black light to the methylene blue solution for 12 hours, measuring the absorbance of the solution at 653 nm before and after the black light irradiation, and calculating according to the following formula:

$$PD(\%)=[(A0-A)/A0]\times 100$$

wherein A0 is the initial absorbance and A is the absorbance after the black light irradiation, (B) a vinyl copolymer obtained from copolymerization of (b-1) 1 to 50% by weight of an alkoxysilyl-containing vinyl monomer, (b-2) 5 to 40% by weight of a UV-absorbing vinyl monomer, and (b-3) 10 to 94% by weight of another monomer copolymerizable therewith, and (C) a solvent, the solids content of composite zinc oxide nanoparticle dispersion (A) being 1 to 50% by weight based on the solids content of vinyl copolymer (B).

In a preferred embodiment, the composite zinc oxide nanoparticles in dispersion (A) have been further surface-treated with at least one member selected from hydrolyzable silanes and partial hydrolytic condensates thereof, said hydrolyzable silane having the general formula (1):

$$(R^1)_x(R^2)_y Si(X')_{4-x-y} \quad (1)$$

wherein $R^1$ and $R^2$ are each independently hydrogen or a substituted or unsubstituted monovalent hydrocarbon group, X' is a halogen atom, $C_1$-$C_3$ alkoxy group, $C_1$-$C_3$ acyloxy group or isocyanate group, x is 0 or 1, y is 0, 1 or 2, and x+y is 0, 1, 2 or 3.

In a preferred embodiment, the zinc oxide nanoparticles from which the composite zinc oxide nanoparticles in dispersion (A) are derived have been prepared by heating and vaporizing a zinc source in direct current arc plasma, oxidizing the zinc vapor, and cooling.

In a preferred embodiment, the composite zinc oxide nanoparticles in dispersion (A) have an average particle size (volume average particle size $D_{50}$) of 10 to 200 nm.

In a preferred embodiment, the dispersing medium is selected from water, alcohols, esters, ketones, glycol ethers, aromatic hydrocarbons, and saturated hydrocarbons, and mixtures thereof.

In a preferred embodiment, the composition may further comprise (D) colloidal silica and/or (E) an organopolysiloxane having a weight average is molecular weight of at least 1,000, represented by the general formula (5).

$$(R)_a Si(Y)_b O_{(4-a-b)/2} \quad (5)$$

Herein R is each independently a substituted or unsubstituted monovalent $C_1$-$C_{18}$ hydrocarbon group other than amino-containing monovalent hydrocarbon group, Y is each independently selected from the group consisting of hydroxyl, $C_1$-$C_3$ alkoxy groups, $C_2$-$C_4$ alkoxyalkoxy groups, $C_1$-$C_6$ acyloxy groups, $C_1$-$C_6$ alkenoxy groups, and isocyanate groups, a and b are numbers in the range: 0<a<2, 0<b<3, and 0<a+b<4.

In a preferred embodiment, the composition may further comprise a UV absorber and/or UV stabilizer.

In a preferred embodiment, component (b-2) is a benzotriazole compound having the general formula (3) or a benzophenone compound having the general formula (4).

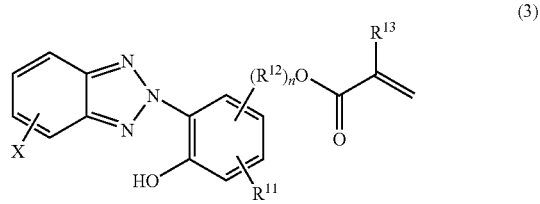

(3)

Herein X is hydrogen or chlorine, $R^{11}$ is hydrogen, methyl or $C_4$-$C_8$ tertiary alkyl group, $R^{12}$ is a straight or branched $C_2$-$C_{10}$ alkylene group, $R^{13}$ is hydrogen or methyl, and n is 0 or 1.

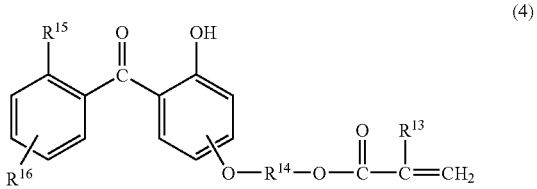

(4)

Herein $R^{13}$ is as defined above, $R^{14}$ is a substituted or unsubstituted, straight or branched $C_2$-$C_{10}$ alkylene group, $R^{15}$ is hydrogen or hydroxyl, and $R^{16}$ is hydrogen, hydroxyl or $C_1$-$C_6$ alkoxy group.

In a preferred embodiment, component (b-3) is selected from a (meth)acrylic monomer having a cyclic hindered amine structure, (meth)acrylate, (meth)acrylonitrile, (meth) acrylamide, alkyl vinyl ether, alkyl vinyl ester, styrene, and derivatives thereof.

The composition may be used as a primer for a silicon base hard coating. Typically, the silicon base hard coating is a cured film of a composition comprising (a) a silicone resin obtained from (co)hydrolytic condensation of at least one member selected from alkoxysilanes and partial hydrolytic condensates thereof, said alkoxysilane having the general formula (2):

$$(R^3)_m(R^4)_n Si(OR^5)_{4-m-n} \quad (2)$$

wherein $R^3$ and $R^4$ are each independently hydrogen or a substituted or unsubstituted monovalent hydrocarbon group, substituents may bond together, $R^5$ is a $C_1$-$C_3$ alkyl group, and m and n are independently 0 or 1 and m+n is 0, 1 or 2, (b) colloidal silica, (c) a curing catalyst, and (d) a solvent.

In another aspect, the invention provides a coated article comprising a substrate and a cured film of the UV-shielding coating composition (defined above) disposed on at least one surface of the substrate directly or via at least one layer. The substrate is typically an organic resin substrate.

ADVANTAGEOUS EFFECTS OF INVENTION

A cured film of the coating composition displays mar resistance and UV shielding property while maintaining visible light transparency, and also has sufficient weather resistance and durability to withstand prolonged outdoor exposure. An article coated with the composition has the same advantages.

BRIEF DESCRIPTION OF DRAWING

FIG. 1 is a diagram showing a particle size distribution of composite zinc oxide nanoparticles in dispersion (A-1) used in Example.

DESCRIPTION OF EMBODIMENTS

The singular forms "a," "an" and "the" include plural references unless the context clearly dictates otherwise. The notation (Cn—Cm) means a group containing from n to m carbon atoms per group. UV refers to the ultraviolet region of the electromagnetic spectrum. Mw refers to a weight average molecular weight as measured by gel permeation chromatography (GPC) versus polystyrene standards. As used herein, the term "film" is interchangeable with "coating" or "layer".

The terminology "(meth)acrylate monomers" refers collectively to acrylate monomers and methacrylate monomers.

Components of the coating composition are described in detail.

Component A

Component (A) is a dispersion in a dispersing medium of composite zinc oxide nanoparticles obtained by coating surfaces of zinc oxide nanoparticles with at least one member selected from the group consisting of oxides and hydroxides of Al, Si, Zr and Sn. The composite zinc oxide nanoparticle dispersion should have a photocatalytic degradability of up to 25%. As used herein, the photocatalytic degradability (PD) is determined by adding the composite zinc oxide nanoparticle dispersion to a methylene blue solution, irradiating black light to the methylene blue solution for 12 hours, measuring the absorbance of the solution at 653 nm before and after the black light irradiation, and calculating a change of absorbance before and after the black light irradiation according to the following formula:

$$PD(\%) = [(A0-A)/A0] \times 100$$

wherein A0 is the initial absorbance and A is the absorbance after the black light irradiation.

More preferably, the composite zinc oxide nanoparticles are obtained by heating a zinc source in a direct current arc plasma for vaporization, oxidizing the zinc vapor, cooling, thus forming zinc oxide nanoparticles, and coating surfaces of the zinc oxide nanoparticles with at least one member selected from oxides and hydroxides of Al, Si, Zr and Sn. The resulting composite zinc oxide nanoparticles are then dispersed in a dispersing medium to yield a composite zinc oxide nanoparticle dispersion.

The (surface-coated) composite zinc oxide nanoparticles are characterized by a fully low photocatalytic activity. In general, zinc oxide nanoparticles have a UV shielding function and a photocatalyst function at the same time. If such zinc oxide nanoparticles are used as a UV shielding agent in a coating composition, their photocatalyst function can degrade the binder so that the hard coat may develop cracks. By contrast, the (surface-coated) composite zinc oxide nanoparticles have a very low photocatalytic activity, minimizing crack formation. Since the (surface-coated) composite zinc oxide nanoparticles are prepared by coating surfaces of zinc oxide nanoparticles with an oxide or hydroxide, typically silica, and are preferably further surface treated with a hydrolyzable silane, their photocatalytic activity is minimized.

The photocatalytic activity may be evaluated by measuring a change of absorbance by photodegradation of methylene blue. Specifically, 0.15 g calculated as composite zinc oxide nanoparticle solids of the (surface-coated) composite zinc oxide nanoparticle dispersion is added to 20 g of a methylene blue solution in water/methanol (1:1 weight ratio) having a methylene blue concentration of 0.01 mmol/L. The solution is stirred in the dark for 30 minutes, and then irradiated with black light at a power of 15 W for 12 hours. Thereafter, the solution was centrifuged at 3,000 rpm for 15 minutes to collect the supernatant, and the absorbance of methylene blue at 653 nm is measured by a UV/visible spectrophotometer. A photocatalytic degradability (PD) is computed from the absorbances before and after the black light irradiation according to the following formula:

$$PD(\%) = [(A0-A)/A0] \times 100$$

wherein A0 is the initial absorbance and A is the absorbance after the black light irradiation. The (surface-coated) composite oxide nanoparticles should have a photocatalytic degradability (PD) of up to 25%, and preferably up to 23%.

The composite zinc oxide nanoparticles having a photocatalytic degradability of up to 25% may be obtained by treating surfaces of zinc oxide nanoparticles by the method to be described herein, i.e., by coating with at least one member selected from oxides and hydroxides of Al, Si, Zr and Sn and optionally, further surface treating with a hydrolyzable silane or partial hydrolytic condensate thereof.

Zinc oxide nanoparticles may be prepared by several plasma methods including DC arc plasma, plasma jet, and high-frequency plasma. The DC arc plasma method is most preferred because of high productivity. Since the zinc oxide nanoparticles prepared by the DC arc plasma method have very strong adsorptivity probably because of good surface crystallinity so that they strongly adsorb amino, imino, quaternary ammonium base or other functional groups in a dispersant, the particles are uniformly dispersed and they do not adsorb each other. As a result, a coating composition having compounded therein the zinc oxide nanoparticles prepared by the DC arc plasma method may form a coating which is highly transparent and free of turbidity. A dispersant may preferably be used in dispersing composite zinc oxide nanoparticles in a dispersing medium.

The DC arc plasma method which is preferably used in preparing zinc oxide nanoparticles involves the steps of providing a consumable anode made of a zinc source such as metallic zinc, producing a plasma flame of argon gas from a cathode, heating the zinc source for evaporation, and oxidizing the zinc vapor, followed by cooling. By this method, zinc oxide nanoparticles are effectively prepared, which have an average particle size (volume average particle size $D_{50}$) in the range of 10 to 200 nm as measured by the light scattering method. Particles with an average particle size of less than 10 nm may be inefficient to prepare whereas an average particle size of more than 200 nm indicates a more possibility of coarse particle formation.

For component (A), composite zinc oxide nanoparticles are prepared by coating surfaces of zinc oxide nanoparticles with at least one member selected from oxides and hydroxides of Al, Si, Zr and Sn. Examples of the composite zinc oxide nanoparticles include those in which zinc oxide nanoparticles are provided with an oxide coating by using an alkoxide of Al, Si, Zr or Sn and effecting hydrolysis, and those which are obtained by adding a sodium silicate aqueous solution to zinc oxide nanoparticles, neutralizing the solution for causing an oxide or hydroxide to precipitate on particle surfaces, and optionally further heating the precipitated oxide or hydroxide to enhance crystallinity.

In the composite zinc oxide nanoparticles, the coating weight of oxide and/or hydroxide is preferably 0.1 to 20% by weight, and more preferably 1 to 10% by weight. If the coating weight is less than 0.1 wt %, then such a coating is ineffective for controlling photocatalytic activity and difficult to improve chemical resistance. If the coating weight is more than 20 wt %, then the amount of the core zinc oxide is less than 80 wt %, sometimes leading to a loss of UV shielding efficiency per unit weight.

In a preferred embodiment, the composite zinc oxide nanoparticles are further surface treated with at least one member selected from hydrolyzable silanes and partially hydrolytic condensates thereof, to produce surface-coated composite oxide nanoparticles. The hydrolyzable silane has the following general formula (1):

$$(R^1)_x(R^2)_y Si(X')_{4-x-y} \qquad (1)$$

wherein $R^1$ and $R^2$ are each independently hydrogen or a substituted or unsubstituted monovalent hydrocarbon group, X' is a halogen atom, $C_1$-$C_3$ alkoxy group, $C_1$-$C_3$ acyloxy group or isocyanate group, x is 0 or 1, y is 0, 1 or 2, and x+y is 0, 1, 2 or 3.

Specifically, surface treatment is carried out by adding a hydrolyzable silane of formula (1) to the composite zinc oxide nanoparticles, hydrolyzing the silane in the presence of water and a basic organic compound, and effecting silanol condensation reaction of the hydrolyzate. This is the so-called sol-gel process.

In formula (1), $R^1$ and $R^2$ are each independently selected from hydrogen and substituted or unsubstituted monovalent hydrocarbon groups. The monovalent hydrocarbon groups are preferably those of 1 to 12 carbon atoms, more preferably 1 to 8 carbon atoms, for example, alkyl, alkenyl, aryl and aralkyl groups. In the case of substituted monovalent hydrocarbon groups, exemplary substituents include halogen atoms such as chlorine and fluorine, amino, epoxy, glycidyloxy, mercapto, (meth)acryloyloxy, and carboxyl. X' is a halogen atom, $C_1$-$C_3$ alkoxy group, $C_1$-$C_3$ acyloxy group or isocyanate group. The subscript x is 0 or 1, y is 0, 1 or 2, and x+y is 0, 1, 2 or 3.

Illustrative, non-limiting examples of the hydrolyzable silane include tetrafunctional silanes such as tetramethoxysilane, tetraethoxysilane, tetra(n-propoxy)silane, tetraisopropoxysilane, and tetra(n-butoxy)silane;

trifunctional silanes such as methyltrimethoxysilane, methyltriethoxysilane, n-propyltrimethoxysilane, isopropyltrimethoxysilane, n-butyltrimethoxysilane, tert-butyltrimethoxysilane, n-hexyltrimethoxysilane, n-octyltrimethoxysilane, isooctyltrimethoxysilane, dodecyltrimethoxysilane, octadecyltrimethoxysilane, cyclohexyltrimethoxysilane, benzyltrimethoxysilane, phenyltrimethoxysilane, phenyltriethoxysilane, 4-butylphenyltrimethoxysilane, 3-aminopropyltrimethoxysilane, 3-aminopropyltriethoxysilane, 3-glycidyloxypropyltrimethoxysilane, 3-glycidyloxypropyltriethoxysilane, 3-mercaptopropyltrimethoxysilane, 3-acryloyloxypropyltrimethoxysilane, 3-carboxypropyltrimethoxysilane, (3,3',3''-trifluoropropyl)trimethoxysilane, (3,3',3''-trifluoropropyl)triethoxysilane, pentafluorophenyltrimethoxysilane, and pentafluorophenyltriethoxysilane;

difunctional silanes such as dimethyldimethoxysilane, dimethyldiethoxysilane, dibutyldimethoxysilane, dihexyldimethoxysilane, didodecyldimethoxysilane, methyloctyldimethoxysilane, dodecylmethyldimethoxysilane, diphenyldimethoxysilane, and diphenyldiethoxysilane; and monofunctional silanes such as triethylmethoxysilane, triethylethoxysilane, tripropylmethoxysilane, triphenylmethoxysilane, triphenylethoxysilane, diphenylmethylmethoxysilane, and diphenylmethylethoxysilane.

Suitable partial hydrolytic condensates of hydrolyzable silanes which can be used herein include partial hydrolytic condensates of tetramethoxysilane which are commercially available under the tradename of M Silicate 51 from Tama Chemicals Co., Ltd., MSI51 from Colcoat Co., Ltd., MS51 and MS56 from Mitsubishi Chemical Co., Ltd., partial hydrolytic condensates of tetraethoxysilane which are commercially available under the tradename of Silicate 35 and Silicate 45 from Tama Chemicals Co., Ltd., ESI40 and ESI48 from Colcoat Co., Ltd., partial co-hydrolytic condensates of tetramethoxysilane and tetraethoxysilane which are commercially available under the tradename of FR-3 from Tama Chemicals Co., Ltd., and EMSi48 from Colcoat Co., Ltd.

Of these, preference is given to tetraalkoxysilanes such as tetramethoxysilane and tetraethoxysilane; trialkoxysilanes such as methyltrimethoxysilane, methyltriethoxysilane, n-propyltrimethoxysilane, isopropyltrimethoxysilane, n-butyltrimethoxysilane, n-hexyltrimethoxysilane, n-octyltrimethoxysilane, and dodecyltrimethoxysilane; dialkoxysilanes such as dimethyldimethoxysilane, dimethyldiethoxysilane, dibutyldimethoxysilane, dihexyldimethoxysilane, octylmethyldimethoxysilane, and dodecylmethyldimethoxysilane; and partial hydrolytic condensates of the foregoing.

As the alkoxysilane, fluoroalkyl or fluoroaryl-containing alkoxysilanes such as (3,3',3''-trifluoropropyl)trimethoxysilane, (3,3',3''-trifluoropropyl)triethoxysilane, pentafluorophenyltrimethoxysilane, and pentafluorophenyltriethoxysilane may also be used alone or in admixture, for imparting improved water resistance, humidity resistance and stain resistance to the surface treatment layer.

These hydrolyzable silanes and partial hydrolytic condensates thereof may be used alone or in admixture of two or more. From the standpoint of forming a surface treatment layer on composite zinc oxide nanoparticles, the amount of monofunctional silane used is preferably up to 70 mol % of the overall silanes. Similarly, the amount of tri- and tetrafunctional silanes used is preferably 1 to 90 mol % of the overall silanes. From the standpoint of improving the denseness of the surface treatment layer for enhancing water resistance, acid resistance, zinc anti-leaching, and photocatalysis-blocking ability, the amount of tri- and tetrafunctional silanes used is more preferably up to 80 mol %, even more preferably up to 70 mol % and more preferably at least 5 mol %, even more preferably at least 10 mol %.

The hydrolyzable silanes and partial hydrolytic condensates thereof are preferably used in such amounts that a ratio of moles of silicon atoms in the hydrolyzable silane to moles of total metal atoms in the composite zinc oxide nanoparticles (i.e., total of zinc atoms in the core and metal atoms in the oxide or hydroxide surface coating) may range from 0.1 to 100. For the purposes of increasing the content of zinc oxide per unit weight, the upper limit of the amount of hydrolyzable silane is such that the ratio is more preferably up to 70 and even more preferably up to 50. For the purposes of imparting anti-agglomeration to composite zinc oxide nanoparticles, the lower limit of the amount of hydrolyzable silane is such that the ratio is more preferably at least 0.5 and even more preferably at least 1.

For the surface treatment of composite zinc oxide nanoparticles, a basic organic compound is preferably used as the catalyst for hydrolysis of the hydrolyzable silane or partial hydrolytic condensate thereof and subsequent silanol condensation reaction. Suitable basic organic compounds include tertiary amines such as trimethylamine, triethylamine, tri-n-propylamine, triisopropylamine, tributylamine, diisopropylethylamine, triphenylamine, N-methylpyrrolidine, and N-methylpiperidine; and nitrogen-containing heterocyclics such as pyridine, methylpyridine, dimethylpyridine, trimethylpyridine and quinoline. Of these, preferred are tertiary amines of 6 to 12 carbon atoms such as triethylamine, tri-n-propylamine, triisopropylamine, tributylamine, diisopropylethylamine, N-methylpyrrolidine, and N-methylpiperidine.

The basic organic compound is preferably used in an amount of 0.001 to 10% by weight based on the hydrolyzable silane or partial hydrolytic condensate. For the purposes of controlling reaction and imparting anti-agglomeration to composite zinc oxide nanoparticles, the maximum amount of basic compound is more preferably up to 8 wt %, and even more preferably up to 5 wt %. From the standpoint of reaction rate or the like, the minimum amount of basic compound is more preferably at least 0.002 wt %, and even more preferably at least 0.005 wt %.

The amount of water used for hydrolysis of the hydrolyzable silane or partial hydrolytic condensate is preferably such that the moles of water is 0.1 to 10 times the moles of hydrolyzable groups in the hydrolyzable silane. For the purposes of controlling hydrolysis of the hydrolyzable silane and silanol condensation reaction, the moles of water is more preferably up to 7 times, even more preferably up to 5 times the moles of hydrolyzable groups. From the standpoints of hydrolysis and silanol condensation reaction, the moles of water is more preferably at least 0.3 time, even more preferably at least 0.5 time the moles of hydrolyzable groups.

With respect to the surface treatment of composite zinc oxide nanoparticles, the procedure and order of addition of the hydrolyzable silane or partial hydrolytic condensate, basic organic compound, and water are not particularly limited. Exemplary procedures, all starting with a liquid phase containing the composite zinc oxide nanoparticles, include (1) a procedure of first adding the hydrolyzable silane to the liquid phase, then adding the basic organic compound and water sequentially or simultaneously thereto, (2) a procedure of first adding the basic organic compound to the liquid phase, then adding the hydrolyzable silane and water sequentially or simultaneously thereto, and (3) a procedure of premixing the hydrolyzable silane, basic organic compound and water, and adding the premix to the liquid phase. Of these, the step of finally adding water is preferred for the control of reaction, and the procedure including first adding the hydrolyzable silane to the liquid phase, then adding the basic organic compound, and finally adding water is most preferred.

From the standpoint of dispersion stability, it is preferred to add a dispersant to the (surface-coated) composite zinc oxide nanoparticle dispersion. Since the dispersant has an organic functional group that adsorbs and orients to surfaces of inorganic particles, and plays the role of protecting nanoparticles, it is essential in preparing a dispersion having a high stability. Exemplary organic functional groups include hydroxyl, carboxyl, sulfonic acid, phosphoric acid, amino, imino, quaternary ammonium, quaternary phosphonium, and salts of the foregoing, amide, and acetylacetonato groups. Of these, carboxyl, phosphoric acid groups, and sodium and ammonium salts thereof are preferred. The preferred compounds having such a functional group and contributing more to dispersion are organic polymers having these functional groups on side chains. Exemplary dispersants include organic polymers derived from at least one of functional monomers such as (meth)acrylic acid, phosphoric acid group-containing (meth)acrylates, hydroxyalkyl(meth)acrylates, maleic anhydride, and sulfonic acid group-containing styrene, and more preferably ionic surfactants such as polyacrylates including (meth)acrylic acid, maleic anhydride, and phosphoric acid group-containing (meth)acrylates, polyester amines, fatty acid amines, sulfonic acid amides, caprolactones, quaternary ammonium salts; nonionic surfactants such as polyoxyethylene and polyol esters; water-soluble polymers such as hydroxypropyl cellulose, and polysiloxane. Useful dispersants are commercially available under the tradename of Poise 520, 521, 532A and 2100 (Kao Corp.), Disperbyk 102, 161, 162, 163, 164, 180 and 190 (BYK), Aron T-40 (Toa Gosei Co., Ltd.), Solsperse 3000, 9000, 17000, 20000, and 24000 (Zeneka Co., Ltd.). They may be used alone or in admixture.

The dispersant is preferably used in an amount of 0 to 30 parts, more preferably 0.5 to 20 parts by weight per 100 parts by weight as solids of the (surface-coated) composite zinc oxide nanoparticles. More than 30 pbw of the dispersant may detract from the mar resistance and weatherability of a coating.

The (surface-coated) composite zinc oxide nanoparticle dispersion (A) is a dispersion of the (surface-coated) composite zinc oxide nanoparticles described above in a dispersing medium. The dispersing medium used herein is not particularly limited. Exemplary media include water, alcohols such as methanol, ethanol, isopropanol, n-butanol, isobutanol, stearyl alcohol, oleyl alcohol, and lauryl alcohol, aromatic hydrocarbons such as toluene and xylene, esters such as ethyl acetate and butyl acetate, ketones such as methyl ethyl ketone and methyl isobutyl ketone, glycol ethers such as ethyl cellosolve and propylene glycol monomethyl ether, and saturated hydrocarbons such as n-hexane, and mixtures thereof.

The amount of the (surface-coated) composite zinc oxide nanoparticles dispersed is not particularly limited. They are preferably dispersed in a concentration as high as possible, but in a range not breaking dispersion. Usually the dispersion contains 5 to 80% by weight, preferably 10 to 60% by weight of the (surface-coated) composite zinc oxide nanoparticles. A concentration of less than 5 wt % corresponds to a higher proportion of the dispersing medium, which may result in a lower concentration of total solids after addition of vinyl copolymer (B) thereto, failing to form a coating with an appropriate thickness. A concentration in excess of 80 wt % may impair dispersion stability or cause a viscosity buildup and hence, handling inconvenience.

A mechanical grinding/dispersing apparatus may be any of well-known apparatus such as a bead mill, jet mill, attritor, sand mill, ultrasonic mill, and disk mill. The bead mill using beads is preferred because component (A) is finished shortly. Exemplary bead mills include Minizeta, Labstar, Star Mill LMZ and Star Mill ZRS by Ashizawa Finetec, Ltd., Ultra-Apex Mill by Kotobuki Industries Co., Ltd., and Maxvisco Mill by Imex Co., Ltd. The dispersing time varies depending on the diameter and identity of beads, and the peripheral speed of the mill. In general, beads of a ceramic material such as alumina or zirconia having a diameter of 0.03 to 0.5 mm are used. The bead mill is preferably operated for a milling time of 20 minutes to 5 hours, more preferably 30 minutes to 3 hours.

When the dispersant described above is used, it should preferably be co-present when the (surface-coated) composite zinc oxide nanoparticles and dispersing medium are mechanically ground and dispersed on the above-mentioned apparatus. If only the (surface-coated) composite zinc oxide nanoparticles and dispersing medium are mechanically ground and dispersed before the dispersant is added, the resulting agglomerates may be difficultly disintegrated to the desired average particle size.

The composite zinc oxide nanoparticles in the dispersion as component (A) should preferably have an average particle size (volume average particle size $D_{50}$) in the range of 10 to 200 nm as measured by the light scattering method. Particles with an average particle size in excess of 200 nm may lead to a coating having low visible light transmittance. A volume average particle size $D_{50}$ of up to 150 nm is more preferred. Particles with a volume average particle size $D_{50}$ of less than 10 nm may be inconvenient to handle. While the particle size distribution does not depend on a measuring instrument, the average particle size is defined herein as measured by Nanotrac UPA-EX150 by Nikkiso Co., Ltd. or LA-910 by Horiba Mfg. Co., Ltd.

It is noted that component (A) used herein is commercially available, for example, as ZNTAB 15 wt %-E16, E15, E16-(1), and E16-(2) by C.I. Kasei Co., Ltd.

Component (A) is compounded with component (B) such that the (surface-coated) composite zinc oxide nanoparticles as solids in component (A) are preferably present in an amount of 1 to 50% by weight, more preferably 3 to 35% by weight, based on the solids of the vinyl copolymer (B). If the amount of the (surface-coated) composite zinc oxide nanoparticles as solids is less than 1 wt %, the desired UV shielding capability may not be obtainable. If the amount of the (surface-coated) composite zinc oxide nanoparticles as solids is more than 50 wt %, it may be difficult to form a coating having visible light transparency, adhesion and mar resistance.

Component B

Component (B) is a vinyl copolymer having alkoxysilyl and organic UV-absorbing groups attached on side chains, preferably a vinyl copolymer having alkoxysilyl groups attached to the vinyl copolymer backbone via Si—C bonds and further preferably organic UV-absorbing groups attached to the vinyl copolymer backbone as well. The vinyl copolymer is obtainable from copolymerization of (b-1) a vinyl monomer having an alkoxysilyl group attached thereto via a Si—C bond, (b-2) a vinyl monomer having an organic UV-absorbing group, and (b-3) another monomer copolymerizable with the foregoing vinyl monomers.

The vinyl monomer (b-1) having an alkoxysilyl group attached thereto via a Si—C bond may be any monomer having one vinyl polymerizable functional group and at least one alkoxysilyl group per molecule.

Suitable vinyl polymerizable functional groups are $C_2$-$C_{12}$ organic groups including vinyl, vinyloxy, (meth)acryloxy, and (α-methyl)styryl. Exemplary groups include vinyl, 5-hexenyl, 9-decenyl, vinyloxymethyl, 3-vinyloxypropyl, (meth)acryloxymethyl, 3-(meth)acryloxypropyl, 11-(meth)acryloxyundecyl, vinylphenyl (or styryl), isopropenylphenyl (or α-methylstyryl), and vinylphenylmethyl (or vinylbenzyl). Of these, (meth)acryloxypropyl is preferred for reactivity and availability.

Examples of the alkoxy moiety of alkoxysilyl group include methoxy, ethoxy, propoxy, isopropoxy, butoxy, isobutoxy, sec-butoxy, and tert-butoxy. Methoxy and ethoxy are preferred for easy control of hydrolysis and availability.

Suitable substituents other than the foregoing include alkyl groups such as methyl, ethyl, propyl, hexyl, and decyl and phenyl groups. Methyl is preferred for availability.

Examples of the vinyl monomer (b-1) having an alkoxysilyl group attached thereto via a Si—C bond include methacryloxymethyltrimethoxysilane, methacryloxypropyltrimethoxysilane, methacryloxyundecyltrimethoxysilane, methacryloxypropylmethyldimethoxysilane, methacryloxypropyldimethylmethoxysilane, methacryloxypropyltriethoxysilane, acryloxypropyltrimethoxysilane, acryloxypropylmethyldimethoxysilane, acryloxypropyldimethylmethoxysilane, acryloxypropyltriethoxysilane, acryloxymethyltrimethoxysilane, acryloxyundecyltrimethoxysilane, vinyltrimethoxysilane, vinyltriethoxysilane, vinylmethyldimethoxysilane, allyltrimethoxysilane, styryltrimethoxysilane, styrylmethyldimethoxysilane, styryltriethoxysilane. Of these, methacryloxypropyltrimethoxysilane, methacryloxypropylmethyldimethoxysilane, methacryloxypropyldimethylmethoxysilane, acryloxypropyltrimethoxysilane, and acryloxypropylmethyldimethoxysilane are preferred for availability, ease of handling, crosslinking density and reactivity.

An appropriate amount of the vinyl monomer (b-1) having an alkoxysilyl group attached thereto via a Si—C bond is 1 to 50% by weight, preferably 3 to 40% by weight based on the copolymer composition. Less than 1 wt % of monomer (b-1) may lead to insufficient formation of a siloxane network by crosslinking with the (surface-coated) composite zinc oxide nanoparticles in dispersion (A) and between vinyl copolymer molecules, failing to form a film having a low coefficient of linear expansion or to improve heat resistance and durability. More than 50 wt % of monomer (b-1) may lead to a high crosslinking density, resulting in a film which is hard and less adhesive, and allow more alkoxysilyl groups to be left unreacted, leading to a likelihood of post-crosslinking with the lapse of time and cracking.

The vinyl monomer (b-2) having an organic UV-absorbing group may be any monomer having an organic UV-absorbing group and a vinyl polymerizable group in a molecule.

Typical vinyl monomers having an organic UV-absorbing group are (meth)acrylic monomers having an organic UV-absorbing group in a molecule, and include benzotriazole compounds having the general formula (3) and benzophenone compounds having the general formula (4).

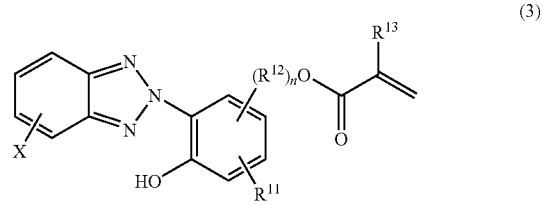

(3)

Herein X is hydrogen or chlorine, $R^{11}$ is hydrogen, methyl or $C_4$-$C_8$ tertiary alkyl group, $R^{12}$ is a straight or branched $C_2$-$C_{10}$ alkylene group, $R^{13}$ is hydrogen or methyl, and n is 0 or 1.

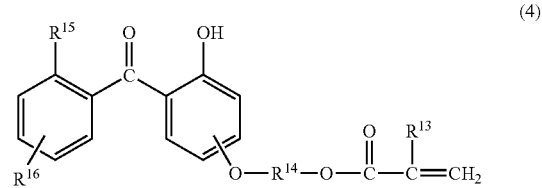

(4)

Herein $R^{13}$ is as defined above, $R^{14}$ is a substituted or unsubstituted, straight or branched $C_2$-$C_{10}$ alkylene group, $R^{15}$ is hydrogen or hydroxyl, and $R^{16}$ is hydrogen, hydroxyl or $C_1$-$C_6$ alkoxy group.

In formula (3), examples of the $C_4$-$C_8$ tertiary alkyl group represented by $R^{11}$ include tert-butyl, tert-pentyl, tert-hexyl, tert-heptyl, tert-octyl, and di-tert-octyl. Examples of the straight or branched $C_2$-$C_{10}$ alkylene group represented by $R^{12}$ include ethylene, trimethylene, propylene, tetramethylene, 1,1-dimethyltetramethylene, butylene, octylene, and decylene.

In formula (4), examples of the straight or branched $C_2$-$C_{10}$ alkylene group represented by $R^{14}$ are as exemplified for $R^{12}$ and substituted forms in which some hydrogen atoms are substituted by halogen atoms. Examples of the alkoxy group represented by $R^{16}$ include methoxy, ethoxy, propoxy, and butoxy.

Examples of suitable benzotriazole derivatives of formula (3) include, but are not limited to, 2-(2'-hydroxy-5'-(meth)acryloxyphenyl)-2H-benzotriazole, 2-(2'-hydroxy-3'-tert-butyl-5'-(meth)acryloxymethylphenyl)-2H-benzotriazole, 2-[2'-hydroxy-5'-(2-(meth)acryloxyethyl)phenyl]-2H-benzotriazole, 2-[2'-hydroxy-3'-tert-butyl-5'-(2-(meth)acryloxyethyl)-phenyl]-5-chloro-2H-benzotriazole, and 2-[2'-hydroxy-3'-methyl-5'-(8-(meth)acryloxyoctyl)phenyl]-2H-benzotriazole.

Examples of suitable benzophenone derivatives of formula (4) include, but are not limited to, 2-hydroxy-4-(2-(meth) acryloxyethoxy)benzophenone, 2-hydroxy-4-(4-(meth)acryloxybutoxy)benzophenone, 2,2'-dihydroxy-4-(2-(meth)acryloxyethoxy)benzophenone, 2,4-dihydroxy-4'-(2-(meth) acryloxyethoxy)benzophenone, 2,2',4-trihydroxy-4'-(2-(meth)acryloxyethoxy)benzophenone, 2-hydroxy-4-(3-(meth)acryloxy-2-hydroxypropoxy)benzophenone, and 2-hydroxy-4-(3-(meth)acryloxy-1-hydroxypropoxy)-benzophenone.

The preferred UV-absorbing vinyl monomers are benzotriazole derivatives of formula (3), with 2-[2'-hydroxy-5'-(2-(meth)acryloxyethyl)phenyl]-2H-benzo-triazole being most preferred. The UV-absorbing vinyl monomers may be used alone or in admixture of two or more.

An appropriate amount of the vinyl monomer (b-2) having an organic UV-absorbing group is 5 to 40% by weight, preferably 5 to 30% by weight, and more preferably 8 to 25% by weight based on the copolymer composition. Less than 5 wt % of monomer (b-2) may fail to provide weatherability. More than 40 wt % of monomer (b-2) may result in a film which is less adhesive or suffers a defective outer appearance such as whitening.

The other monomer (b-3) which is copolymerizable with monomers (b-1) and (b-2) is not particularly limited as long as it is so copolymerizable. Suitable monomers include (meth) acrylic monomers having a cyclic hindered amine structure, (meth)acrylates, (meth)acrylonitrile, (meth)acrylamides, alkyl vinyl ethers, alkyl vinyl esters, styrene, and derivatives thereof.

Examples of the (meth)acrylic monomer having a cyclic hindered amine structure include 2,2,6,6-tetramethyl-4-piperidinyl methacrylate and 1,2,2,6,6-pentamethyl-4-piperidinyl methacrylate. These monomers may be used in admixture of two or more.

Examples of (meth)acrylates and derivatives include (meth)acrylic acid esters of monohydric alcohols such as methyl(meth)acrylate, ethyl(meth)acrylate, n-propyl(meth) acrylate, isopropyl(meth)acrylate, n-butyl(meth)acrylate, isobutyl(meth)acrylate, sec-butyl(meth)acrylate, t-butyl (meth)acrylate, n-pentyl(meth)acrylate, isopentyl(meth) acrylate, n-hexyl(meth)acrylate, isohexyl(meth)acrylate, n-heptyl(meth)acrylate, isoheptyl(meth)acrylate, 2-ethylhexyl(meth)acrylate, n-octyl(meth)acrylate, isooctyl(meth) acrylate, n-nonyl(meth)acrylate, isononyl(meth)acrylate, n-decyl(meth)acrylate, isodecyl(meth)acrylate, n-undecyl (meth)acrylate, n-dodecyl(meth)acrylate, lauryl(meth)acrylate, palmityl(meth)acrylate, stearyl(meth)acrylate, cyclohexyl(meth)acrylate, 4-methylcyclohexyl(meth)acrylate, 4-t-butylcyclohexyl(meth)acrylate, isobornyl(meth)acrylate, dicyclopentanyl(meth)acrylate, dicyclopentenyloxyethyl (meth)acrylate, and benzyl(meth)acrylate;

(meth)acrylic acid esters of alkoxy(poly)alkylene glycols such as 2-methoxyethyl(meth)acrylate, 2-methoxypropyl (meth)acrylate, 3-methoxypropyl(meth)acrylate, 2-methoxybutyl(meth)acrylate, 3-methoxybutyl(meth)acrylate, 4-methoxybutyl(meth)acrylate, methoxypolyethylene glycol (meth)acrylate (ethylene glycol units, 2 to 20), and methoxypolypropylene glycol(meth)acrylate (propylene glycol units, 2 to 20);

mono(meth)acrylic acid esters of polyols such as 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate, 4-hydroxybutyl(meth) acrylate, glycerol mono(meth)acrylate, pentaerythritol mono (meth)acrylate, polyethylene glycol mono(meth)acrylate (ethylene glycol units, 2 to 20), polypropylene glycol mono (meth)acrylate (propylene glycol units, 2 to 20);

poly(meth)acrylic acid esters of polyols such as ethylene glycol di(meth)acrylate, propylene glycol di(meth)acrylate, butylene glycol di(meth)acrylate, glycerol di(meth)acrylate, glycerol tri(meth)acrylate, pentaerythritol di(meth)acrylate, pentaerythritol tetra(meth)acrylate, 1,4-cyclohexane diol di(meth)acrylate, polyethylene glycol di(meth)acrylate (ethylene glycol units, 2 to 20), and polypropylene glycol di(meth)acrylate (propylene glycol units, 2 to 20);

(poly)esters of non-polymerizable polybasic acids with hydroxyalkyl(meth)acrylates such as mono[2-(meth)acryloyloxyethyl]succinate, di[2-(meth)acryloyloxyethyl]succinate, mono[2-(meth)acryloyloxyethyl]adipate, di[2-(meth) acryloyloxyethyl]adipate, mono[2-(meth)acryloyloxyethyl] phthalate, and di[2-(meth)acryloyloxyethyl]phthalate;

amino-containing (meth)acrylates such as 2-aminoethyl (meth)acrylate, 2-(N-methylamino)ethyl(meth)acrylate, 2-(N,N-dimethylamino)ethyl(meth)acrylate, 2-(N-ethylamino)ethyl(meth)acrylate, 2-(N,N-diethylamino)ethyl (meth)acrylate, 3-(N,N-dimethylamino)propyl(meth)acrylate, and 4-(N,N-dimethylamino)butyl(meth)acrylate; and epoxy-containing (meth)acrylates such as glycidyl(meth) acrylate.

Examples of the (meth)acrylonitrile derivatives include α-chloroacrylonitrile, α-chloromethylacrylonitrile, α-trifluoromethylacrylonitrile, α-methoxyacrylonitrile, α-ethoxyacrylonitrile, and vinylidene cyanide.

Examples of the (meth)acrylamide derivatives include N-methyl(meth)acrylamide, N,N-dimethyl(meth)acrylamide, N-ethyl(meth)acrylamide, N,N-diethyl(meth)acrylamide, N-methoxy(meth)acrylamide, N,N-dimethoxy(meth) acrylamide, N-ethoxy(meth)acrylamide, N,N-diethoxy (meth)acrylamide, diacetone(meth)acrylamide, N-methylol (meth)acrylamide, N-(2-hydroxyethyl)(meth)acrylamide, N,N-dimethylaminomethyl(meth)acrylamide, N-(2-dimethylamino)ethyl(meth)acrylamide, N,N'-methylenebis (meth)acrylamide, and N,N'-ethylenebis(meth)acrylamide.

Examples of the alkyl vinyl ether include methyl vinyl ether, ethyl vinyl ether, butyl vinyl ether, and hexyl vinyl ether. Examples of the alkyl vinyl ester include vinyl formate, vinyl acetate, vinyl acrylate, vinyl butyrate, vinyl caproate, and vinyl stearate. Examples of the styrene and derivatives thereof include styrene, α-methylstyrene, and vinyltoluene.

Of the foregoing monomers, (meth)acrylates are preferred. More preferred are methyl(meth)acrylate, ethyl(meth)acrylate, isopropyl(meth)acrylate, n-butyl(meth)acrylate, isobutyl(meth)acrylate, n-hexyl(meth)acrylate, 2-ethylhexyl (meth)acrylate, isononyl(meth)acrylate, lauryl(meth) acrylate, cyclohexyl(meth)acrylate, 4-methylcyclohexyl (meth)acrylate, 4-t-butylcyclohexyl(meth)acrylate, isobornyl(meth)acrylate, dicyclopentanyl(meth)acrylate, and dicyclopentenyloxyethyl(meth)acrylate.

The other copolymerizable monomer (b-3) may be used alone or in admixture of two or more.

An appropriate amount of the other monomer (b-3) is 10 to 94% by weight, preferably 20 to 94% by weight, and more preferably 35 to 90% by weight based on the copolymer composition. More than 94 wt % of monomer (b-3) may lead to insufficient crosslinking between vinyl copolymer molecules and with the (surface-coated) composite zinc oxide nanoparticles in dispersion (A), failing to form a film having a low coefficient of linear expansion or to improve heat resistance, durability and weatherability. Less than 10 wt % of monomer (b-3) may lead to a high crosslinking density, resulting in a film which is less adhesive and suffers a defective outer appearance such as whitening.

The vinyl copolymer (B) is obtainable from copolymerization reaction of (b-1) the vinyl monomer having an alkoxysilyl group attached thereto via a Si—C bond, (b-2) the vinyl monomer having an organic UV-absorbing group, and (b-3) the other monomer copolymerizable with the foregoing vinyl monomers. The reaction may be performed simply by dissolving the monomers in a solvent, adding a radical polymerization initiator selected from peroxides such as dicumyl peroxide and benzoyl peroxide and azo compounds such as azobisisobutyronitrile to the solution, and heating the solution at 50 to 150° C., especially 70 to 120° C. for 1 to 10 hours, especially 3 to 8 hours.

The vinyl copolymer should preferably have a weight average molecular weight (Mw) of 1,000 to 300,000, and more preferably 5,000 to 250,000, as measured by GPC versus polystyrene standards. A vinyl copolymer with too high a Mw may be too viscous to synthesize and to handle. A vinyl copolymer with too low a Mw may lead to a film which suffers a defective outer appearance such as whitening and is less adhesive, durable or weatherable.

Component C

Component (C) is a solvent. The solvent is not particularly limited as long as components (A) and (B) are dissolvable or dispersible therein. A solvent mainly comprising a highly polar organic solvent is preferred. Exemplary solvents include alcohols such as methanol, ethanol, isopropyl alcohol, n-butanol, isobutanol, t-butanol, and diacetone alcohol; ketones such as methyl propyl ketone, diethyl ketone, methyl isobutyl ketone, cyclohexanone, and diacetone alcohol; ethers such as dipropyl ether, dibutyl ether, anisole, dioxane, ethylene glycol monoethyl ether, ethylene glycol monobutyl ether, propylene glycol monomethyl ether, and propylene glycol monomethyl ether acetate; and esters such as ethyl acetate, propyl acetate, butyl acetate, and cyclohexyl acetate. The solvents may be used alone or in admixture.

Component (C) is preferably added in such an amount that the coating composition may have a solids concentration of 1 to 30% by weight, more preferably 5 to 25% by weight. Outside the range, a coating obtained by applying the composition and curing may be defective. A concentration below the range may lead to a coating which is likely to sag, wrinkle or mottle, failing to provide the desired hardness and mar resistance. A concentration beyond the range may lead to a coating which is prone to brushing, whitening or cracking.

Component D

The composition may further comprise (D) colloidal silica. Particularly when it is desired to enhance the hardness and mar resistance of a coating, an appropriate amount of colloidal silica may be added. It is a colloidal dispersion of nano-size silica having a particle size of about 5 to 50 nm in a medium such as water or organic solvent. Commercially available water-dispersed or organic solvent-dispersed colloidal silica may be used herein. Examples include Snowtex-O, OS, OL and Methanol Silica Sol, IPA-ST, IBA-ST, PMA-ST, and MEK-ST by Nissan Chemical Industries Ltd. The colloidal silica may be compounded in an amount of 0 to 100 parts, preferably 5 to 100 parts, and more preferably 5 to 50 parts by weight per 100 parts by weight as solids of components (A) and (B).

Component E

The composition may further comprise (E) an organopolysiloxane. It may be any organopolysiloxane having a weight average molecular weight (Mw) of at least 1,000, represented by the general formula (5).

$$(R)_a Si(Y)_b O_{(4-a-b)/2} \quad (5)$$

Herein R which may be the same or different is a substituted or unsubstituted monovalent hydrocarbon group of 1 to 18 carbon atoms other than an amino-containing monovalent hydrocarbon group, Y which may be the same or different is hydroxyl, $C_1$-$C_3$ alkoxy, $C_2$-$C_4$ alkoxyalkoxy, $C_1$-$C_6$ acyloxy, $C_1$-$C_6$ alkenoxy, or isocyanate group, a and b are numbers satisfying $0<a<2$, $0<b<3$, and $0<a+b<4$.

The organopolysiloxane (E) used herein is preferably selected such that a primer layer formed by curing the coating composition may have a coefficient of linear expansion of up to $150 \times 10^{-6}/°$ C. Since this organopolysiloxane has a hydrolyzable silyl group and/or SiOH group in a molecule, it forms siloxane crosslinks with hydrolyzable silyl groups and/or SiOH groups in the vinyl polymer (B) to produce a composite, contributing to a reduction of coefficient of linear expansion.

In formula (5), R is each independently selected from substituted or unsubstituted monovalent $C_1$-$C_{18}$ hydrocarbon groups other than amino-containing monovalent hydrocarbon groups, for example, alkyl, aryl, haloalkyl, haloaryl and alkenyl groups, and substituted forms of the foregoing hydrocarbon groups in which some hydrogen atoms are substituted by epoxy, (meth)acryloxy, or mercapto groups, as well as organic groups separated by heteroatom such as O or S. Examples include alkyl groups such as methyl, ethyl, propyl, isopropyl, butyl, hexyl, decyl, and cyclohexyl; aryl groups such as phenyl and phenethyl; haloalkyl groups such as 3-chloropropyl, 3,3,3-trifluoropropyl, and 3,3,4,4,5,5,6,6,6-nonafluorohexyl; haloaryl groups such as p-chlorophenyl; alkenyl groups such as vinyl, allyl, 9-decenyl and p-vinylbenzyl; epoxy-containing organic groups such as 3-glycidoxypropyl, β-(3,4-epoxycyclohexyl)ethyl and 9,10-epoxydecyl; (meth)acryloxy-containing organic groups such as γ-methacryloxypropyl and γ-acryloxypropyl; and mercapto-containing organic groups such as γ-mercaptopropyl and p-mercaptomethylphenylethyl. Of these, alkyl groups are preferred particularly when the composition is used in the application where mar resistance and weatherability are required, and epoxy and (meth)acryloxy-substituted hydrocarbon groups are preferred where adhesion is required.

Y is each independently selected from hydroxyl, $C_1$-$C_3$ alkoxy, $C_2$-$C_4$ alkoxyalkoxy, $C_1$-$C_6$ acyloxy, $C_1$-$C_6$ alkenoxy, and isocyanate groups, for example, methoxy, ethoxy, propoxy, isopropoxy, methoxymethoxy, methoxyethoxy, acetoxy, and isopropenyl. Inter alia, methoxy, ethoxy and isopropoxy are preferred when the reactivity of organopolysiloxane (E) is taken into account.

The subscripts a and b are numbers satisfying $0<a<2$, $0<b<3$, and $0<a+b<4$, and preferably $0.2 \leq a \leq 1.7$, $0.1 \leq b \leq 2.7$, and $0.3 \leq a+b \leq 3.7$.

The organopolysiloxane (E) may be obtained from (co) hydrolytic condensation of one or more silane compounds of the general formula (6) or partial hydrolytic condensates thereof by any well-known method. The (co)hydrolytic condensates of such silane compounds may be used alone or in admixture of more than one type.

$$(R)_c Si(Z)_{4-c} \quad (6)$$

Herein R is the same as R in formula (5), Z which may be the same or different is a $C_1$-$C_3$ alkoxy, $C_2$-$C_4$ alkoxyalkoxy, $C_1$-$C_6$ acyloxy, $C_1$-$C_6$ alkenoxy, or isocyanate group, and c is an integer of 0 to 2.

In formula (6), R is preferably an alkyl group where the composition is used in the application wherein mar resistance and weatherability are required, or an epoxy or (meth)acryloxy-substituted hydrocarbon group where adhesion is required.

Z is each independently selected from $C_1$-$C_3$ alkoxy, $C_2$-$C_4$ alkoxyalkoxy, $C_1$-$C_6$ acyloxy, $C_1$-$C_6$ alkenoxy, and isocyanate groups, for example, methoxy, ethoxy, propoxy, isopropoxy, methoxymethoxy, methoxyethoxy, acetoxy, and isopropenyl. Inter alia, methyl, ethyl and isopropenyl are preferred because the hydrolytic condensation has high reactivity, and the alcohol and ketone Z—H formed have high vapor pressures and are thus easy to distill off.

Examples of the silane compound satisfying the above conditions include trialkoxy or triacyloxysilanes such as methyltrimethoxysilane, methyltriethoxysilane, methyltris(2-methoxyethoxy)silane, methyltriacetoxysilane, methyltripropoxysilane, methyltriisopropenoxysilane, ethyltrimethoxysilane, ethyltriethoxysilane, vinyltrimethoxysilane, vinyltriethoxysilane, vinyltriacetoxysilane, vinyltris(2-methoxyethoxy)silane, vinyltriisopropenoxysilane, phenyltrimethoxysilane, phenyltriethoxysilane, phenyltriacetoxysilane, γ-chloropropyltrimethoxysilane, γ-chloropropyltriethoxysilane, γ-chloropropyltripropoxysilane, 3,3,3-trifluoropropyltrimethoxysilane, γ-glycidoxypropyltrimethoxysilane, γ-glycidoxypropyltriethoxysilane, β-(3,4-epoxycyclohexyl)ethyltrimethoxysilane, β-(3,4-epoxycyclohexyl)ethyltriethoxysilane, γ-methacryloxypropyltrimethoxysilane, γ-acryloxypropyltrimethoxysilane, γ-mercaptopropyltrimethoxysilane, γ-mercaptopropyltriethoxysilane,
as well as partial hydrolytic condensates of methyltrimethoxysilane which are commercially available under the tradenames KC-89C and X-40-9220 from Shin-Etsu Chemical Co., Ltd., and partial hydrolytic condensates of methyltrimethoxysilane and γ-glycidoxypropyltrimethoxysilane which are commercially available under the tradename X-41-1056 from Shin-Etsu Chemical Co., Ltd.

Also useful are dialkoxysilanes and diacyloxysilanes such as dimethyldimethoxysilane, dimethyldiethoxysilane, dimethyldi(2-methoxyethoxy)silane, dimethyldiacetoxysilane, dimethyldipropoxysilane, dimethyldiisopropenoxysilane, vinylmethyldimethoxysilane, vinylmethyldiethoxysilane, vinylmethyldiacetoxysilane, vinylmethyldi(2-methoxyethoxy)silane, vinylmethyldiisopropenoxysilane, phenylmethyldimethoxysilane, phenylmethyldiethoxysilane, phenylmethyldiacetoxysilane, γ-propylmethyldimethoxysilane, γ-propylmethyldiethoxysilane, γ-propylmethyldipropoxysilane, 3,3,3-trifluoropropylmethyldimethoxysilane, γ-glycidoxypropylmethyldimethoxysilane, γ-glycidoxypropylmethyldiethoxysilane, β-(3,4-epoxycyclohexyl)ethylmethyldimethoxysilane, β-(3,4-epoxycyclohexyl)ethylmethyldiethoxysilane, γ-methacryloxypropylmethyldimethoxysilane, γ-acryloxypropylmethyldimethoxysilane, γ-mercaptopropylmethyldimethoxysilane, and γ-mercaptopropylmethyldiethoxysilane.

Examples of the tetraalkoxysilane include methyl silicate, ethyl silicate, n-propyl silicate, etc. Also included are partial hydrolytic condensates of tetramethoxysilane which are commercially available under the tradename of M Silicate 51 from Tama Chemicals Co., Ltd., MSI51 from Colcoat Co., Ltd., MS51 and MS56 from Mitsubishi Chemical Co., Ltd., partial hydrolytic condensates of tetraethoxysilane which are commercially available under the tradename of Silicate 35 and Silicate 45 from Tama Chemicals Co., Ltd., ESI40 and ESI48 from Colcoat Co., Ltd., and partial co-hydrolytic condensates of tetramethoxysilane and tetraethoxysilane which are commercially available under the tradename of FR-3 from Tama Chemicals Co., Ltd., and EMSi48 from Colcoat Co., Ltd.

Also included are bissilane compounds such as bis(trimethoxysilyl)ethane, bis(trimethoxysilyl)hexane, bis(trimethoxysilyl)decane, bis(triethoxysilyl)hexane, bis(trimethoxysilyl)benzene, and bis(trimethoxysilyloxydimethylsilyl)benzene.

For example, the organopolysiloxane (E) may be obtained from (co)hydrolysis of a silicon compound of formula (6) or partial hydrolytic condensate thereof alone or in admixture of two or more, in water at pH 1 to 7, preferably pH 2 to 6, and more preferably pH 2 to 5. For the hydrolysis, metal oxide nanoparticles, typically colloidal silica, dispersed in water may also be used. A catalyst may be added to the system for adjusting its pH to the described range and to promote hydrolysis. Suitable catalysts include organic acids and inorganic acids such as hydrogen fluoride, hydrochloric acid, nitric acid, formic acid, acetic acid, propionic acid, oxalic acid, citric acid, maleic acid, benzoic acid, malonic acid, glutaric acid, glycolic acid, methanesulfonic acid, and toluenesulfonic acid, solid acid catalysts such as cation exchange resins having carboxylic or sulfonic acid groups on the surface, and water-dispersed metal oxide nanoparticles such as acidic water-dispersed colloidal silica. Alternatively, a dispersion of metal oxide nanoparticles such as colloidal silica in water or organic solvent may be co-present upon hydrolysis.

For the hydrolysis, water may be used in an amount of 20 to 3,000 parts by weight per 100 parts by weight of the silicon compound of formula (6) and/or partial hydrolytic condensate combined. An excess amount of water may not only lead to a reduction of system efficiency, but also give rise to a problem that when the hydrolyzate is formulated in a final coating composition, the hydrolyzate may have a reduced solubility in the vinyl polymer (B), and the remaining water can adversely affect to detract from coating and drying efficiencies. With these taken into account, the amount of water is preferably from 50 parts to 200 parts by weight. Less than 20 pbw of water may produce an organopolysiloxane whose weight average molecular weight (Mw) does not build up to reach the optimum range to be described later, the Mw being determined by GPC versus polystyrene standards.

Hydrolysis may be performed by adding dropwise or dumping water to the alkoxysilane or partial hydrolytic condensate thereof, or inversely, by adding dropwise or dumping the alkoxysilane or partial hydrolytic condensate thereof to water. An organic solvent may be present in the reaction solution although the absence of an organic solvent is preferred. This is because the resultant organosiloxane tends to lower its Mw (as analyzed by GPC versus polystyrene standards) as the organic solvent becomes more.

To produce the organopolysiloxane (E), the hydrolysis must be followed by condensation. Condensation may be effected continuous to the hydrolysis while maintaining the liquid temperature at room temperature or heating at a temperature of not higher than 100° C. A temperature higher than 100° C. may cause gelation. Condensation may be promoted by distilling off the alcohol or ketone formed by hydrolysis at a temperature of at least 80° C. and atmospheric or subatmospheric pressure. Also for the purpose of promoting condensation, condensation catalysts such as basic compounds, acidic compounds or metal chelates may be added. Prior to or during the condensation step, an organic solvent may be added for the purpose of adjusting the progress of condensation or the concentration, or a dispersion of metal oxide nanoparticles such as colloidal silica in water or organic solvent may also be added. For the reason that an organopolysiloxane generally builds up its molecular weight and reduces its solubility in water or alcohol formed as condensation proceeds, the organic solvent added herein should preferably be one having a boiling point of at least 80° C. and a relatively high polarity in which the organopolysiloxane is fully dissolvable.

Examples of the organic solvent include alcohols such as isopropyl alcohol, n-butanol, isobutanol, t-butanol, and diacetone alcohol; ketones such as methyl propyl ketone, diethyl ketone, methyl isobutyl ketone, cyclohexanone, and diacetone alcohol; ethers such as dipropyl ether, dibutyl ether, anisole, dioxane, ethylene glycol monoethyl ether, ethylene glycol monobutyl ether, propylene glycol monomethyl ether, and propylene glycol monomethyl ether acetate; and esters such as propyl acetate, butyl acetate, and cyclohexyl acetate.

The organopolysiloxane resulting from condensation should preferably have a weight average molecular weight (Mw) of at least 1,000, more preferably 1,000 to 50,000, and even more preferably 1,500 to 20,000, as measured by GPC versus polystyrene standards. With a Mw below the range, a coating tends to have low toughness and insufficient adhesion. On the other hand, a polysiloxane with too high a Mw may become less soluble in the vinyl polymer (B) so that the resins in a coating undergo phase separation, causing inefficient coating operation and incurring film whitening.

An amount of organopolysiloxane (E) is 0 to 100 parts by weight, preferably 5 to 100 parts by weight, and more preferably 5 to 50 parts by weight per 100 parts by weight of component (B).

If desired, suitable additives may be added to the coating composition insofar as they do not adversely affect the invention. Suitable additives include pH adjustors, leveling agents, thickeners, pigments, dyes, metal oxide nanoparticles, metal powder, antioxidants, UV absorbers, UV stabilizers, heat ray reflecting/absorbing agents, flexibilizers, antistatic agents, anti-staining agents, and water repellents.

For enhanced storage stability, the coating composition may preferably be adjusted to pH 2 to 8, more preferably pH 3 to 6. Since a pH value outside the range may lessen storage stability, a pH adjustor may be added so that the pH falls in the range. For a coating composition having a pH value outside the range, if the pH is more acidic than the range, a basic compound such as ammonia or ethylenediamine may be added for pH adjustment. If the pH is more basic than the range, an acidic compound such as hydrochloric acid, nitric acid, acetic acid or citric acid may be added for pH adjustment. The pH adjustment method is not particularly limited.

The coating composition may lose storage stability in that it absorbs water during storage or service, whereby alkoxysilyl groups on the vinyl copolymer (B) undergo hydrolysis. To prevent water absorption, a dehydrating agent may be added to the composition. Examples of the dehydrating agent include orthocarboxylic acid esters such as methyl orthoformate, ethyl orthoformate, and ethyl orthoacetate, dialkyl carbodimides such as dicyclohexyl carbodimide, and solid adsorbents such as silica gel and molecular sieves.

When the substrate to be coated with the coating composition is made of an organic resin or wood, a UV absorber and/or UV stabilizer other than components (A) and (B) may be added to the coating composition for the purpose of preventing the substrate from yellowing or surface degradation. The UV absorber and/or UV stabilizer which is compatible with the coating composition and low volatile is preferred.

Examples of the UV absorber include well-known inorganic oxides such as cerium oxide and zirconium oxide, excluding the (surface-coated) composite zinc oxide nanoparticles as component (A), and those oxides having controlled photocatalytic activity are preferred for further enhancing the UV shielding function. Metal chelate compounds of titanium, zinc, and zirconium and (partial) hydrolyzates and condensates thereof are also useful. Preferred organic examples include derivatives of compounds having hydroxybenzophenone, benzotriazole, cyanoacrylate and triazine as a main skeleton. Also included are polymers such as vinyl polymers having the UV absorber incorporated in a side chain and copolymers thereof with another vinyl monomer, and silyl-modified UV absorbers, and (partial) hydrolytic condensates thereof.

Exemplary UV absorbers include 2,4-dihydroxybenzophenone, 2,2',4,4'-tetrahydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-n-benzyloxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-propoxybenzophenone, 2,2'-dihydroxy-4-methoxy-4'-butoxybenzophenone, 2,3,4-trihydroxybenzophenone, 2-(2-hydroxy-5-t-methylphenyl)benzotriazole, 2-(2-hydroxy-5-t-octylphenyl)benzotriazole, 2-(2-hydroxy-3,5-di-t-butylphenyl)benzotriazole, ethyl-2-cyano-3,3-diphenyl acrylate, 2-ethylhexyl-2-cyano-3,3'-diphenyl acrylate, 2-(2-hydroxy-4-hexyloxyphenyl)-4,6-diphenyltriazine, (co) polymers of 2-hydroxy-4-(2-acryloxyethoxy)benzophenone, (co)polymers of 2-(2'-hydroxy-5'-methacryloxyethylphenyl)-2H-benzotriazole,
the reaction product of 2,4-dihydroxybenzophenone with γ-glycidoxypropyltrimethoxysilane,
the reaction product of 2,2',4,4'-tetrahydroxybenzophenone with γ-glycidoxypropyltrimethoxysilane, and (partial) hydrolyzates thereof. These organic UV absorbers may be used alone or in admixture.

The UV absorber is preferably compounded in an amount of 0 to 100% by weight, and when used, in an amount of more preferably 0.3 to 100%, even more preferably 0.3 to 30% by weight based on the solids in the coating composition.

Preferred as the UV stabilizer are compounds having at least one cyclic hindered amine structure in a molecule, which are compatible with the coating composition and low volatile. Exemplary UV stabilizers include 3-dodecyl-1-(2,2',6,6'-tetramethyl-4-piperidinyl)pyrrolidine-2,5-dione, N-methyl-3-dodecyl-1-(2,2',6,6'-tetramethyl-4-piperidinyl)-pyrrolidine-2,5-dione, N-acetyl-3-dodecyl-1-(2,2',6,6'-tetramethyl-4-piperidinyl)-pyrrolidine-2,5-dione, bis(2,2',6,6'-tetramethyl-4-piperidyl)sebacate, bis(1,2,2',6,6'-pentamethyl-4-piperidyl)sebacate, tetrakis(2,2',6,6'-tetramethyl-4-piperidyl)1,2,3,4-butane-tetracarboxylate, tetrakis(1,2,2',6,6'-pentamethyl-4-piperidyl)1,2,3,4-butane-tetracarboxylate,
the condensate of 1,2,3,4-butanetetracarboxylic acid, 2,2',6,6'-tetramethyl-4-piperidinol and tridecanol, 8-acetyl-3-dodecyl-7,7',9,9'-tetramethyl-1,3,8-triazaspiro-[4,5]decane-2,4-dione,
the condensate of 1,2,3,4-butanetetracarboxylic acid, 1,2,6,6'-pentamethyl-4-piperidinol and β,β,β',β'-tetramethyl-3,9-(2,4,8,10-tetraoxaspiro[5,5']undecane)diethanol, and the condensate of 1,2,3,4-butanetetracarboxylic acid, 2,2',6,6'-pentamethyl-4-piperidinol and β,β,β',β'-tetra-methyl-3,9-(2,4,8,10-tetraoxaspiro[5,5']undecane)diethanol. Also useful are photostabilizers which are modified by silylation for the purpose of anchoring the photostabilizers as described in JP-B S61-56187, for example, 2,2',6,6'-tetramethylpiperidino-4-propyltrimethoxysilane, 2,2',6,6'-tetramethylpiperidino-4-propylmethyldimethoxysilane, 2,2',6,6'-tetramethylpiperidino-4-propyltriethoxysilane, 2,2',6,6'-tetramethylpiperidino-4-propylmethyldiethoxysilane, and (partial) hydrolyzates thereof. These photostabilizers may be used in admixture of two or more.

The UV stabilizer is preferably compounded in an amount of 0 to 10% by weight, and when used, in an amount of more preferably 0.03 to 10%, even more preferably 0.03 to 7.5% by weight based on the solids in the coating composition.

The coating composition may be obtained by mixing selected amounts of the respective components in a standard manner.

The coating composition may be applied to at least one surface of a substrate directly or via another layer or layers. It is then cured to yield a coated article. The coating composition may be applied to the substrate by any ordinary coating techniques. Suitable coating techniques include brush coating, spray coating, dipping, flow coating, roll coating, curtain coating, spin coating, and knife coating.

The substrate used herein is not particularly limited and includes molded plastics, wood items, ceramics, glass, metals, and composites thereof. Of these, plastic materials or organic resin substrates are preferred. Examples include polycarbonate, polystyrene, acrylic resins, modified acrylic resins, urethane resins, thiourethane resins, polycondensates of halogenated bisphenol A and ethylene glycol, acrylic urethane resins, halogenated aryl-containing acrylic resins, and sulfur-containing resins. These resin substrates which have been surface treated, specifically by conversion treatment, corona discharge treatment, plasma treatment, acid or alkaline treatment are also useful. Also included are laminated substrates comprising a resin substrate and a surface layer formed thereon from a resin of different type from the substrate. Exemplary laminated substrates include those consisting of a polycarbonate resin substrate and a surface layer of acrylic resin or urethane resin which are prepared by co-extrusion or lamination technique, and those consisting of a polyester resin substrate and a surface layer of acrylic resin formed thereon.

After the coating composition is applied, the coating may be air dried or heated to form a cured film. The curing temperature and time are not particularly limited although the coating is preferably heated at a temperature below the heat resistant temperature of the substrate for 10 minutes to 2 hours. More preferably the coating is heated at a temperature of 80 to 135° C. for 30 minutes to 2 hours.

The thickness of the cured film is not particularly limited and may be selected as appropriate for a particular application. The cured film preferably has a thickness of 0.1 to 50 µm, and more preferably in the range of 1 to 20 µm for ensuring that the cured film has hardness, mar resistance, long-term stable adhesion and crack resistance.

The coating composition of the invention is characterized by visible light transmittance in coating form. An index of visible light transmittance is the haze of a film. In general, the haze increases as the film becomes thicker. The film having a thickness of up to 5 µm preferably meets a haze of up to 2.0, more preferably up to 1.5, and even more preferably up to 1.0. The haze is measured by a haze meter NDH2000 (Nippon Denshoku Industries Co., Ltd.).

A haze of up to 2.0 may be attained in the film by coating surfaces of zinc oxide nanoparticles in dispersion (A) with at least one of oxides and hydroxides of Al, Si, Zr and Sn, for thereby controlling agglomeration of nanoparticles.

The coating composition is also characterized by weather resistance in coating form. An index of weather resistance is given by a weathering test to see whether or not a coating is kept intact, that is, whether or not a coating is cracked. To examine the development of cracks in a coating, the weathering test is carried out by using Eyesuper UV tester W-151 (Iwasaki Electric Co., Ltd.), and repeating cycles consisting of [black panel temperature 63° C., humidity 50% RH, illuminance 50 mW/cm$^2$, raining intervals of 10 sec/hour for 5 hours] and [black panel temperature 30° C., humidity 95% RH for one hour]. Those samples whose coating undergoes no cracking after 250 hours, preferably after 300 hours, and more preferably after 500 hours are regarded as passing the test. Cracks in the coating are visually inspected.

Such a level of weatherability may be attained in the film by coating surfaces of zinc oxide nanoparticles in dispersion (A) with at least one of oxides and hydroxides of Al, Si, Zr and Sn, or further surface treating with at least one selected from hydrolyzable silanes and partial hydrolytic condensates thereof, for thereby controlling the photocatalytic activity which is otherwise against weatherability improvement.

The coating composition may be applied to the surface of a substrate directly or via another layer or layers. Suitable intervening layers include a primer layer, UV-absorbing layer, printing layer, recording layer, heat-ray shielding layer, adhesive layer, inorganic vapor-deposited layer and the like.

Where higher mar resistance is desired, the coating composition of the invention may be used as a primer. On the surface of a cured film of the coating composition, a silicon base hard coating may be formed. The resulting laminate system may provide high mar resistance and long-term weatherability at the same time.

The silicon base hard coatings include an evaporated $SiO_2$ coating and preferably, a cured film of a composition comprising a silicone resin and colloidal silica. Exemplary coatings are described in JP-A S51-002736 and JP-A H09-071654.

In a preferred embodiment, the silicon base hard coating is a cured film of a composition comprising components (a) to (d):

(a) a silicone resin obtained from (co)hydrolytic condensation of at least one member selected from alkoxysilanes and partial hydrolytic condensates thereof, the alkoxysilane having the general formula (2):

$$(R^3)_m(R^4)_n Si(OR^5)_{4-m-n} \qquad (2)$$

wherein $R^3$ and $R^4$ are each independently hydrogen or a substituted or unsubstituted monovalent hydrocarbon group, substituents may bond together, $R^5$ is a $C_1$-$C_3$ alkyl group, and m and n are independently 0 or 1 and m+n is 0, 1 or 2, (b) colloidal silica,
(c) a curing catalyst, and
(d) a solvent.

Component (a)

Component (a) is a silicone resin obtained from (co)hydrolytic condensation of at least one member selected from alkoxysilanes and partial hydrolytic condensates thereof. The alkoxysilane has the general formula (2):

$$(R^3)_m(R^4)_n Si(OR^5)_{4-m-n} \qquad (2)$$

wherein $R^3$ and $R^4$ are each independently hydrogen or a substituted or unsubstituted monovalent hydrocarbon group, and substituents may bond together, $R^5$ is a $C_1$-$C_3$ alkyl group, and m and n are independently 0 or 1 and m+n is 0, 1 or 2.

In formula (2), $R^3$ and $R^4$ are each independently selected from hydrogen and substituted or unsubstituted monovalent hydrocarbon groups, preferably of 1 to 12 carbon atoms, more preferably 1 to 8 carbon atoms, for example, hydrogen; alkyl groups such as methyl, ethyl, propyl, butyl, pentyl, hexyl, heptyl and octyl; cycloalkyl groups such as cyclopentyl and cyclohexyl; alkenyl groups such as vinyl and allyl; aryl groups such as phenyl; halo-substituted hydrocarbon groups such as chloromethyl, γ-chloropropyl, and 3,3',3"-trifluoropropyl; and (meth)acryloxy, epoxy, mercapto, amino or isocyanato-substituted hydrocarbon groups such as γ-methacryloxypropyl, γ-glycidoxypropyl, 3,4-epoxycyclohexylethyl, γ-mercaptopropyl, γ-aminopropyl, and γ-isocyanatopropyl. An isocyanurate group having a plurality of isocyanato-substituted hydrocarbon groups bonded together is also exemplary. Of these, alkyl groups are preferred for the application where mar resistance and weatherability are required, and epoxy, (meth)acryloxy and isocyanurate-substituted hydrocarbon groups are preferred where toughness and dyeability are required.

$R^5$ is selected from $C_1$-$C_3$ alkyl groups, for example, methyl, ethyl, n-propyl, and isopropyl. Of these, methyl and ethyl are preferred because the alkoxysilane is highly reactive in hydrolytic condensation and the alcohol $R^5OH$ formed can be readily distilled off due to a high vapor pressure.

The alkoxysilane of formula (2) wherein m=0 and n=0 is (a-1) a tetraalkoxysilane of the formula: $Si(OR^5)_4$, or a partial hydrolytic condensate thereof. Examples of suitable tetraalkoxysilane and partial hydrolytic condensate thereof include tetramethoxysilane, tetraethoxysilane, tetraisopropoxysilane, tetrabutoxysilane; partial hydrolytic condensates of tetramethoxysilane, which are commercially available under the trade name of M Silicate 51 from Tama Chemicals Co., Ltd., MSI51 from Colcoat Co., Ltd., and MS51 and MS56 from Mitsubishi Chemical Co., Ltd.; partial hydrolytic condensates of tetraethoxysilane, which are commercially available under the trade name of Silicate 35 and Silicate 45 from Tama Chemicals Co., Ltd., ESI40 and ESI48 from Colcoat Co., Ltd.; and partial co-hydrolytic condensates of tetramethoxysilane and tetraethoxysilane, which are commercially available under the trade name of FR-3 from Tama Chemicals Co., Ltd. and EMSi48 from Colcoat Co., Ltd.

The alkoxysilane of formula (2) wherein m=1 and n=0 or m=0 and n=1 is (a-2) a trialkoxysilane of the formula: $R^3Si(OR^5)_3$ or $R^4Si(OR^5)_3$ or a partial hydrolytic condensate thereof. Examples of suitable trialkoxysilane and partial hydrolytic condensate thereof include hydrogentrimethoxysilane, hydrogentriethoxysilane, methyltrimethoxysilane, methyltriethoxysilane, methyltriisopropoxysilane, ethyltrimethoxysilane, ethyltriethoxysilane, ethyltriisopropoxysilane, propyltrimethoxysilane, propyltriethoxysilane, propyltriisopropoxysilane, phenyltrimethoxysilane, vinyltrimethoxysilane, allyltrimethoxysilane, γ-methacryloxypropyltrimethoxysilane, γ-methacryloxypropyltriethoxysilane, γ-acryloxypropyltrimethoxysilane, γ-glycidoxypropyltrimethoxysilane, γ-glycidoxypropyltriethoxysilane, β-(3,4-epoxycyclohexyl)ethyltrimethoxysilane, γ-chloropropyltrimethoxysilane, 3,3,3-trifluoropropyltrimethoxysilane, 3,3,3-trifluoropropyltriethoxysilane, perfluorooctylethyltrimethoxysilane, γ-mercaptopropyltrimethoxysilane, γ-aminopropyltrimethoxysilane, γ-aminopropyltriethoxysilane, N-(2-aminoethyl)aminopropyltrimethoxysilane, γ-isocyanatopropyltrimethoxysilane, γ-isocyanatopropyltriethoxysilane, tris(3-trimethoxysilylpropyl)isocyanurate and tris(3-triethoxysilylpropyl)isocyanurate in which isocyanate groups are bonded together; and partial hydrolytic condensates of methyltrimethoxysilane, which are commercially available as KC-89S and X-40-9220 from Shin-Etsu Chemical Co., Ltd.; and partial hydrolytic condensates of methyltrimethoxysilane and γ-glycidoxypropyltrimethoxysilane, which are commercially available as X-41-1056 from Shin-Etsu Chemical Co., Ltd.

The alkoxysilane of formula (2) wherein m=1 and n=1 is (a-3) a dialkoxysilane of the formula: $(R^3)(R^4)Si(OR^5)_2$ or a partial hydrolytic condensate thereof. Examples of suitable dialkoxysilane and partial hydrolytic condensate thereof include methylhydrogendimethoxysilane, methylhydrogendiethoxysilane, dimethyldimethoxysilane, dimethyldiethoxysilane, methylethyldimethoxysilane, diethyldimethoxysilane, diethyldiethoxysilane, methylpropyldimethoxysilane, methylpropyldiethoxysilane, diisopropyldimethoxysilane, phenylmethyldimethoxysilane, vinylmethyldimethoxysilane, γ-glycidoxypropylmethyldimethoxysilane, γ-glycidoxypropylmethyldiethoxysilane, β-(3,4-epoxycyclohexyl)ethylmethyldimethoxysilane, γ-methacryloxypropylmethyldimethoxysilane, γ-methacryloxypropylmethyldiethoxysilane, γ-mercaptopropylmethyldimethoxysilane, γ-aminopropylmethyldiethoxysilane, and N-(2-aminoethyl)aminopropylmethyldimethoxysilane.

The silicone resin as component (a) may be prepared using the foregoing components (a-1), (a-2) and (a-3) in any desired proportion. For the purpose of improving storage stability, mar resistance and crack resistance, it is preferred to use 0 to 50 Si-mol % of component (a-1), 50 to 100 Si-mol % of component (a-2) and 0 to 10 Si-mol % of component (a-3), based on the total amount of components (a-1), (a-2) and (a-3) which is equal to 100 Si-mol %. It is more preferred to use 0 to 30 Si-mol % of component (a-1), 70 to 100 Si-mol % of component (a-2) and 0 to 10 Si-mol % of component (a-3). If the main component (a-2) is less than 50 Si-mol %, the resin may have a lower crosslinking density and less curability, tending to form a cured film with a lower hardness. If component (a-1) is in excess of 50 Si-mol %, the resin may have a higher crosslinking density and a lower toughness to permit crack formation.

It is noted that Si-mol % is a percentage based on the total Si moles, and the Si mole means that in the case of a monomer, its molecular weight is 1 mole, and in the case of a dimer, its average molecular weight divided by 2 is 1 mole.

The silicone resin as component (a) may be prepared through (co)hydrolytic condensation of components (a-1), (a-2) and (a-3) by a well-known method. For example, an alkoxysilane (a-1), (a-2) or (a-3) or partial hydrolytic condensate thereof or a mixture thereof is (co)hydrolyzed in water at pH 1 to 7.5, preferably pH 2 to 7. At this point, metal oxide nanoparticles dispersed in water such as silica sol may be used. A catalyst may be added to the system for adjusting its pH to the described range and to promote hydrolysis. Suitable catalysts include organic acids and inorganic acids such as hydrogen fluoride, hydrochloric acid, nitric acid, formic acid, acetic acid, propionic acid, oxalic acid, citric acid, maleic acid, benzoic acid, malonic acid, glutaric acid, glycolic acid, methanesulfonic acid, and toluenesulfonic acid, solid acid catalysts such as cation exchange resins having carboxylic or sulfonic acid groups on the surface, and water-dispersed metal oxide nanoparticles such as acidic water-dispersed silica sol. Alternatively, a dispersion of metal oxide nanoparticles in water or organic solvent such as silica sol may be co-present upon hydrolysis. In case the dispersing medium of the (surface-coated) composite zinc oxide nanoparticle dispersion as component (A) is water or a water-soluble organic solvent, it is acceptable to mix water, an acidic hydrolytic catalyst and alkoxysilane in the co-presence of this dispersion so that hydrolytic condensation reaction may take place. This process is advantageous because the dispersion of the (surface-coated) composite zinc oxide nanoparticles in component (A) is improved, by virtue of a possibility of partial reaction between surfaces of the (surface-coated) composite zinc oxide nanoparticles in component (A) and the hydrolytic condensate of alkoxysilane.

In this hydrolysis, water may be used in an amount of 20 to 3,000 parts by weight per 100 parts by weight of the total of alkoxysilanes (a-1), (a-2) and (a-3) and partial hydrolytic condensates thereof. An excess of water may lower system efficiency and in a final coating composition, residual water can adversely affect coating operation and drying. Water is preferably used in an amount of 50 parts by weight to less than 150 parts by weight for the purpose of improving storage stability, mar resistance, and crack resistance. With a smaller amount of water, the silicone resin may fail to reach a weight average molecular weight in the optimum range, as measured by GPC versus polystyrene standards. With an excess of water, the content in the silicone resin of units $R'SiO_{3/2}$ in units $R'SiO_{(3-p)/2}(OW)_p$ derived from component (a-2) may fail to reach the optimum range to maintain a coating crack resistant wherein R' is $R^3$ or $R^4$, W is hydrogen or $R^5$, $R^3$, $R^4$, and $R^5$ are as defined above, and p is an integer of 0 to 3.

Hydrolysis may be effected by adding dropwise or pouring water to the alkoxysilane or partial hydrolytic condensate, or inversely by adding dropwise or pouring the alkoxysilane or partial hydrolytic condensate to water. The reaction system may contain an organic solvent. However, the absence of organic solvent is preferred because there is a tendency that as the reaction system contains more organic solvent, the resulting silicone resin has a lower weight average molecular weight as measured by GPC versus polystyrene standards.

To produce the silicone resin (a), the hydrolysis must be followed by condensation. Condensation may be effected continuous to the hydrolysis while maintaining the liquid temperature at room temperature or heating at a temperature of not higher than 100° C. A temperature higher than 100° C. may cause gelation. Condensation may be promoted by distilling off the alcohol formed by hydrolysis at a temperature of at least 80° C. and atmospheric or subatmospheric pressure. Also for the purpose of promoting condensation, condensation catalysts such as basic compounds, acidic compounds or metal chelates may be added. Prior to or during the condensation step, an organic solvent may be added for the purpose of adjusting the progress of condensation or the concentration, or a dispersion of metal oxide nanoparticles in water or organic solvent such as silica sol or the (surface-coated) composite zinc oxide nanoparticle dispersion (A) may also be added. For the reason that a silicone resin generally builds up its molecular weight and reduces its solubility in water or alcohol formed as condensation proceeds, the organic solvent added herein should preferably be one having a boiling point of at least 80° C. and a relatively highly polarity in which the silicone resin is fully dissolvable. Examples of the organic solvent include alcohols such as isopropyl alcohol, n-butanol, isobutanol, t-butanol, and diacetone alcohol; ketones such as methyl propyl ketone, diethyl ketone, methyl isobutyl ketone, cyclohexanone, and diacetone alcohol; ethers such as dipropyl ether, dibutyl ether, anisole, dioxane, ethylene glycol monoethyl ether, ethylene glycol monobutyl ether, propylene glycol monomethyl ether, and propylene glycol monomethyl ether acetate (PGMEA); and esters such as propyl acetate, butyl acetate, and cyclohexyl acetate.

The silicone resin resulting from condensation should preferably have a weight average molecular weight (Mw) of at least 1,500, more preferably 1,500 to 50,000, and even more preferably 2,000 to 20,000, as measured by GPC versus polystyrene standards. With a Mw below the range, a coating tends to be less tough and prone to cracking. On the other hand, a silicone resin with too high a Mw tends to have a low hardness and the resins in a coating undergo phase separation, incurring film whitening.

Component (b)

Component (b) is identical with component (D) described above. Description of component (b) is omitted herein to avoid redundancy. An amount of component (b) is 0 to 100 parts, preferably 5 to 100 parts, and more preferably 5 to 50 parts by weight per 100 parts by weight, calculated as solids, of the silicone resin (a).

Component (c)

Component (c) is a curing catalyst which may be selected from those catalysts commonly used in silicon base hard coating compositions. The curing catalyst serves to promote condensation reaction of condensable groups such as silanol and alkoxy groups in silicone resin (a). Suitable catalysts include basic compounds such as lithium hydroxide, sodium hydroxide, potassium hydroxide, sodium methylate, sodium propionate, potassium propionate, sodium acetate, potassium acetate, sodium formate, potassium formate, trimethylbenzylammonium hydroxide, tetramethylammonium hydroxide (TMAH), tetramethylammonium acetate, n-hexylamine, tributylamine, diazabicycloundecene (DBU), and and dicyandiamide; metal-containing compounds such as tetraisopropyl titanate, tetrabutyl titanate, acetylacetonatotitanium, aluminum triisobutoxide, aluminum triisopropoxide, tris(acetylacetonato)aluminum, aluminum diisopropoxy (ethyl acetoacetate), aluminum perchlorate, aluminum chloride, cobalt octylate, (acetylacetonato)cobalt, (acetylacetonato)iron, (acetylacetonato)tin, dibutyltin octylate, and dibutyltin laurate; and acidic compounds such as p-toluenesulfonic acid and trichloroacetic acid. Of these, preference is given to sodium propionate, sodium acetate, sodium formate, trimethylbenzylammonium hydroxide, tetramethylammonium hydroxide, tris(acetylacetonato)aluminum, and aluminum diisopropoxy(ethyl acetoacetate).

Another useful curing catalyst is an aromatic-free compound having the general formula (7). The silicone coating composition loaded with this catalyst becomes shelf stable while remaining curable and crack resistant.

$$[(R^6)(R^7)(R^8)(R^9)M]^+ \cdot X''^- \qquad (7)$$

Herein $R^6$, $R^7$, $R^8$ and $R^9$ are each independently a $C_1$-$C_{18}$ alkyl group which may be substituted with halogen, each of $R^6$, $R^7$, $R^8$ and $R^9$ has a Taft-Dubois steric substituent constant Es, the total of constants Es of $R^6$, $R^7$, $R^8$ and $R^9$ is up to $-0.5$, M is an ammonium or phosphonium cation, and $X''^-$ is a halide anion, hydroxide anion or $C_1$-$C_4$ carboxylate anion.

Taft-Dubois steric substituent constant Es is a rate of esterification reaction of a substituted carboxylic acid under acidic conditions relative to methyl group $CH_3$ and represented by the equation:

$$Es = \log(k/k0)$$

wherein k is a rate of acidic esterification reaction of a substituted carboxylic acid under specific conditions and k0 is a rate of acidic esterification reaction of methyl-substituted carboxylic acid under the same conditions. See J. Org. Chem., 45, 1164 (1980) and J. Org. Chem., 64, 7707 (1999).

In general, Taft-Dubois steric substituent constant Es is an index representing the steric bulkiness of a substituent. For example, the value of constant Es is 0.00 for methyl, $-0.08$ for ethyl, $-0.31$ for n-propyl, and $-0.31$ for n-butyl, indicating that the lower (or more negative) the Es, the more sterically bulky is the substituent.

In formula (7), the total of constants Es of $R^6$, $R^7$, $R^8$ and $R^9$ should be equal to or more negative than $-0.5$. If the total of constants Es is above $-0.5$, a coating composition becomes low in shelf stability and forms a coat which can be cracked or whitened in a water-resistant test and loses adhesion, especially water-resistant adhesion and boiling adhesion. In the event the total of constants Es is above $-0.5$, for example, $R^6$, $R^7$, $R^8$ and $R^9$ are all methyl, a corresponding catalyst of formula (7) becomes higher in catalytic activity, but a coating composition comprising the same tends to lose shelf stability and a coat thereof becomes so hygroscopic as to develop defects in a water-resistant test. The total of constants Es of $R^6$, $R^7$, $R^8$ and $R^9$ is preferably not lower than −3.2, and more preferably not lower than −2.8.

In the above formula, $R^6$, $R^7$, $R^8$ and $R^9$ are alkyl groups of 1 to 18 carbon atoms, preferably 1 to 12 carbon atoms, which may be substituted with halogen, for example, alkyl groups such as methyl, ethyl, propyl, butyl, pentyl, hexyl, heptyl, and octyl; cycloalkyl groups such as cyclopentyl and cyclohexyl; and halo-alkyl groups such as chloromethyl, γ-chloropropyl and 3,3',3"-trifluoropropyl.

M is an ammonium or phosphonium cation. $X^{n-}$ is a halide anion, hydroxide anion or $C_1$-$C_4$ carboxylate anion, and preferably a hydroxide anion or acetate anion.

Illustrative examples of the curing catalyst having formula (7) include, but are not limited to, hydroxides such as tetra-n-propylammonium hydroxide, tetra-n-butylammonium hydroxide, tetra-n-pentylammonium hydroxide, tetra-n-hexylammonium hydroxide, tetracyclohexylammonium hydroxide, tetrakis(trifluoromethyl)ammonium hydroxide, trimethylcyclohexylammonium hydroxide, trimethyl(trifluoromethyl)ammonium hydroxide, trimethyl-t-butylammonium hydroxide, tetra-n-propylphosphonium hydroxide, tetra-n-butylphosphonium hydroxide, tetra-n-pentylphosphonium hydroxide, tetra-n-hexylphosphonium hydroxide, tetracyclohexylphosphonium hydroxide, tetrakis(trifluoromethyl)phosphonium hydroxide, trimethylcyclohexylphosphonium hydroxide, trimethyl(trifluoromethyl)phosphonium hydroxide, and trimethyl-t-butylphosphonium hydroxide; salts of the foregoing hydroxides with halogenic acids and with $C_1$-$C_4$ carboxylic acids. Inter alia, tetrapropylammonium hydroxide, tetrapropylammonium acetate, tetrabutylammonium hydroxide, tetrabutylammonium acetate, tetrabutylphosphonium hydroxide, and tetrabutylphosphonium acetate are preferred. These may be used alone or in admixture of two or more, or in combination with any of the aforementioned well-known curing catalysts.

Insofar as component (c) is compounded in an effective amount to cure the silicone resin (a), the amount of the catalyst is not particularly limited. Specifically the curing catalyst is preferably used in an amount of 0.0001 to 30% by weight, more preferably 0.001 to 10% by weight, based on the solids of the silicone resin. Less than 0.0001 wt % of the catalyst may lead to under-cure and low hardness. More than 30 wt % of the catalyst may lead to a coating which is prone to cracking and poorly water resistant.

Component (d)

Component (d) is a solvent. It may be any solvents which are well known in the industry for silicon base hard coating compositions. It may be identical or similar to component (C) described above, and its description is omitted herein. Component (d) is preferably added in such an amount that the silicon base hard coating composition may have a solids concentration of 1 to 30% by weight, more preferably 5 to 25% by weight.

EXAMPLE

Synthesis Examples, Examples and Comparative Examples are given below by way of illustration and not by way of limitation. Unless otherwise stated, all parts and percents are by weight. The viscosity is as measured at 25° C. according to JIS Z8803. Mw denotes a weight average molecular weight as determined by gel permeation chromatography (GPC) using polystyrene standards.

Surface-Coated Composite Zinc Oxide Nanoparticle Dispersion (A)

A-1: ZNTAB 15 wt %-E16(2) by C.I. Kasei Co., Ltd. (a dispersion obtained by applying silica to zinc oxide nanoparticles prepared by DC arc plasma method, surface treating them with methyltrimethoxysilane, and dispersing them in an alcohol mixture, solids concentration: 15%, particle size distribution measured by Nanotrac UPA-EX150 (Nikkiso Co., Ltd.): FIG. 1, average particle size (volume average particle size $D_{50}$): 105 nm)

A-2: ZNTAB 15 wt %-E15 by C.I. Kasei Co., Ltd. (a dispersion obtained by applying alumina to zinc oxide nanoparticles prepared by DC arc plasma method and dispersing them in an alcohol mixture with the aid of a dispersant, solids concentration: 15%, average particle size (volume average particle size $D_{50}$): 98 nm)

Synthesis of Vinyl Copolymer having Alkoxysilyl and UV-Absorbing Groups Attached to Side Chains (B)

Synthesis Example 1

A 2-L flask equipped with a stirrer, condenser and thermometer was charged with 152 g of diacetone alcohol as a solvent and heated at 80° C. under a nitrogen stream. To the flask, a 240-g portion of a previously prepared monomer mix solution (containing 67.5 g of 2-[2'-hydroxy-5'-(2-methacryloxyethyl)phenyl]-2H-benzotriazole under the trade name of RUVA-93 from Otsuka Chemical Co., Ltd., 90 g of γ-methacryloxypropyltrimethoxysilane, 270 g of methyl methacrylate, 22.5 g of glycidyl methacrylate, and 350 g of diacetone alcohol), and a 54-g portion of a previously prepared solution of 2.3 g of 2,2'-azobis(2-methylbutyronitrile) as a polymerization initiator in 177.7 g of diacetone alcohol were added in sequence. The solution was allowed to react at 80° C. for 30 minutes, after which the remainder of the monomer mix solution and the remainder of the initiator solution were simultaneously added dropwise at 80-90° C. over 1.5 hours. Stirring continued at 80-90° C. for a further 5 hours.

The thus obtained solution of a vinyl polymer having trimethoxysilyl and organic UV-absorbing groups attached to side chains had a viscosity of 5,050 mPa-s, and the copolymer contained 15% of the UV-absorbing monomer and 20% of the vinyl monomer having trimethoxysilyl attached to a side chain via a Si—C bond. The copolymer had a Mw of 60,800. The vinyl copolymer (solution) thus obtained is designated B-1.

Synthesis Examples 2, 3 and Comparative Synthesis Examples 1, 2

Vinyl copolymers (solutions) designated B-2, B-3, and comparative vinyl copolymers (solutions) designated RB-1, RB-2 were prepared as in Synthesis Example 1 in accordance with the monomer formulation and amount shown in Table 1.

TABLE 1

Composition of vinyl copolymer (B) having alkoxysilyl and organic UV-absorbing groups attached to side chains (unit: pbw)

|  | Synthesis Example | | | Comparison | |
|---|---|---|---|---|---|
|  | 1 | 2 | 3 | 1 | 2 |
| (B) Vinyl copolymer | B-1 | B-2 | B-3 | RB-1 | RB-2 |
| MPTMS | 90 | 45 | 135 | 90 |  |
| RUVA-1 | 67.5 | 45 |  |  | 67.5 |
| RUVA-2 |  |  | 112 |  |  |
| MMA | 270 | 285 | 203 | 337.5 | 355 |
| GMA | 22.5 | 45 |  | 22.5 | 22.5 |
| VIAc |  | 25 |  |  |  |
| MHALS |  | 5 |  |  | 5 |
| Total charge | 450 | 450 | 450 | 450 | 450 |

MPTMS: γ-methacryloxypropyltrimethoxysilane
RUVA-1: 2-[2'-hydroxy-5'-(2-methacryloxyethyl)phenyl]-2H-benzotriazole under the trade name of RUVA-93 from Otsuka Chemical Co., Ltd.
RUVA-2: 2-hydroxy-4-(2-acryloxyethyl)benzophenone under the trade name of BP-1A from Osaka Organic Chemical Industry, Ltd.
MMA: methyl methacrylate
GMA: glycidyl methacrylate
VIAc: vinyl acetate
MHALS: 1,2,2,6,6-pentamethyl-4-piperidyl methacrylate

Synthesis of Organopolysiloxane (E)

Synthesis Example 4

A 2-L flask equipped with a stirrer, condenser and thermometer was charged with 338 g of methyltrimethoxysilane. With stirring at 20° C., 98 g of water-dispersed colloidal silica (Snowtex O, Nissan Chemical Industries Ltd., average particle size 15-20 nm, $SiO_2$ content 20%) and 230 g of 0.25N acetic acid aqueous solution were added. The mixture was stirred for 3 hours and at 60° C. for a further 3 hours, after which 300 g of cyclohexanone was added. The byproduct methanol was distilled off under atmospheric pressure. Then 300 g of isopropanol and 134 g of a 0.25% isopropanol solution of tetrabutylammonium hydroxide were added. The solution was diluted with isopropanol to a nonvolatile content of 20% (JIS K6833). The organopolysiloxane solution thus obtained had a viscosity of 4.1 $mm^2$/s and a Mw of 2,500. This organopolysiloxane is designated E-1.

Synthesis of Colloidal Silica-Laden Organopolysiloxane Composition

Synthesis Example 5

A 1-L flask equipped with a stirrer, condenser and thermometer was charged with 336 g of methyltriethoxysilane and 94 g of isobutanol. To the solution which was stirred under ice cooling and kept below 5° C., 283 g of water-dispersed colloidal silica (Snowtex O, Nissan Chemical Industries Ltd., average particle size 15-20 nm, $SiO_2$ content 20%) below 5° C. was added. The mixture was stirred under ice cooling for 3 hours and at 20-25° C. for a further 12 hours, after which 27 g of diacetone alcohol and 50 g of propylene glycol monomethyl ether were added. Then 3 g of a 10% sodium propionate aqueous solution as a curing catalyst and 0.2 g of a polyether-modified silicone KP-341 (Shin-Etsu Chemical Co., Ltd.) as a leveling agent were added, followed by adjustment to pH 6-7 with acetic acid. It was diluted with isobutanol to a nonvolatile content of 20% (JIS K6833) and aged at room temperature for 5 days, yielding a colloidal silica-laden organopolysiloxane composition having a viscosity of 4.2 $mm^2$/s and a Mw of 1,100. This colloidal silica-laden organopolysiloxane composition is designated HC-1.

Synthesis Example 6

A 2-L flask equipped with a stirrer, condenser and thermometer was charged with 328 g of methyltrimethoxysilane and 10 g of 3,3,3-trifluoropropyltrimethoxysilane. To the solution which was stirred and kept at 20° C., 98 g of water-dispersed colloidal silica (Snowtex O, Nissan Chemical Industries Ltd., average particle size 15-20 nm, $SiO_2$ content 20%) and 230 g of 0.25N acetic acid aqueous solution were added. The mixture was stirred for 3 hours and at 60° C. for a further 3 hours, after which 300 g of cyclohexanone was added. The by-product methanol was distilled off under atmospheric pressure. Then 300 g of isopropanol, 134 g of a 0.25% isopropanol solution of tetrabutylammonium hydroxide as a curing catalyst, and 0.5 g of a polyether-modified silicone KP-341 (Shin-Etsu Chemical Co., Ltd.) as a leveling agent were added. It was diluted with isopropanol to a nonvolatile content of 20% (JIS K6833). There was yielded a colloidal silica-laden organopolysiloxane composition having a viscosity of 4.3 $mm^2$/s and a Mw of 2,300. This colloidal silica-laden organopolysiloxane composition is designated HC-2.

Reference Example

Measurement of Photocatalytic Activity of Zinc Oxide Nanoparticle Dispersion An amount of surface-coated composite zinc oxide nanoparticle dispersion A-1 or A-2, titanium oxide nanoparticle dispersion RA-1, or zinc oxide nanoparticle dispersion RA-2 or RA-3 to provide 0.15 g of oxide nanoparticle solids was added to 20 g of a methylene blue solution in water/methanol (1:1 weight ratio) having a methylene blue concentration of 0.01 mmol/L. The solution was stirred in the dark for 30 minutes, and then irradiated with black light of 15 W for 12 hours. Thereafter, the solution was centrifuged at 3,000 rpm for 15 minutes to collect the supernatant, and the absorbance of methylene blue at 653 nm was measured by a UV/visible spectrophotometer. A photocatalytic degradability (PD) was computed from the absorbances before and after the black light irradiation according to the following formula:

$$PD(\%) = [(A0-A)/A0] \times 100$$

wherein A0 is the initial absorbance and A is the absorbance after the black light irradiation. The results are shown in Table 2.

RA-1: titanium oxide nanoparticle dispersion Optolake 1120Z (11RU-7-A8), solids concentration 20%, JGC Catalysts and Chemicals Ltd.

RA-2: zinc oxide nanoparticle dispersion prepared by a technique other than DC arc plasma technique ZS-303-IPA, solids concentration 30%, average particle size (volume average particle size $D_{50}$) 81 nm, Sumitomo Osaka Cement Co., Ltd.

RA-3: ZNAP 15 wt %-G0 by C.I. Kasei Co., Ltd. dispersion of zinc oxide nanoparticles prepared by DC arc plasma technique in alcohol mixture, solids concentration 15%, average particle size (volume average particle size $D_{50}$) 89 nm

TABLE 2

Photocatalytic activity of
surface-coated composite zinc oxide nanoparticles

| | Blank | Surface-coated composite zinc oxide nanoparticle dispersion | | | | |
| --- | --- | --- | --- | --- | --- | --- |
| | | A-1 | A-2 | RA-1 | RA-2 | RA-3 |
| Initial absorbance @653 nm | 1.275 | — | — | — | — | — |
| Absorbance @653 nm after 12 hr irradiation | — | 0.999 | 1.085 | 0.000 | 0.891 | 0.827 |
| Photocatalytic degradability, % | — | 21.6 | 14.9 | 100 | 30.1 | 35.1 |

Examples 1-5 and Comparative Examples 1-5

Coating compositions were prepared in accordance with the formulation of Tables 3 and 4 and tested. It is noted that among the abbreviations shown in Tables, those abbreviations not described in Synthesis Examples have the following meaning.

Silica Nanoparticles Dispersed in Organic Solvent
  D-1: colloidal silica dispersed in propylene glycol monomethyl ether acetate (PMA-ST, solids concentration 30%, primary particle size 10-15 nm, Nissan Chemical Industries, Ltd.)

Thermoplastic Resin
  POL-1: 40% diacetone alcohol solution of polymethyl methacrylate resin (Dianal BR-80, Mitsubishi Rayon Co., Ltd.)

Organic UV-Absorber
  UVA-1: 2-[2-hydroxy-4-(1-octyloxycarbonylethoxy)-phenyl]-4,6-bis(4-phenylphenyl)-1,3,5-triazine (Tinuvin 479, Ciba Specialty Chemicals)
  UVA-2: 2,2',4,4'-tetrahydroxybenzophenone (Seesorb 106, Shipro Kasei Kaisha, Ltd.)

Hindered Amine Photostabilizer
  HALS-1: N-acetyl-3-dodecyl-1-(2,2,6,6-tetramethyl-4-piperidinyl)pyrrolidine-2,5-dione (Sandbar 3058Liq, Clariant)

Dehydrating Agent
  F-1: ethyl orthoformate

Measurement of physical properties and evaluation were performed as follows.

A cured film of each coating composition was evaluated in a single film form.

Prior to coating, each of the coating compositions formulated in accordance with the formulation (solids basis) of Tables 3 and 4 was diluted with a 20/80 (weight ratio) solvent mixture of diacetone alcohol and propylene glycol monomethyl ether to a total solids concentration of 10%. The coating solution was applied onto a cleaned surface of a 0.5 mm polycarbonate resin substrate (Iupilon Sheet, Mitsubishi Engineering-Plastics Corp.) by dip coating and heat cured at 120° C. for 60 minutes to form a film of about 6-8 μm thick. The film was tested for physical properties, with the results also shown in Tables 3 and 4.

(1) Dispersion Stability
The coating composition was allowed to stand at room temperature for one week, after which the dispersed state of (surface-coated) composite zinc oxide nanoparticles was observed and rated according to the following criterion.
  ○: well dispersed, no settlement
  x: agglomerated and settled (2) Coefficient of Linear Expansion (CE)
A 1.5 g portion of the coating composition was weighed and placed in an aluminum cup where it was held at room temperature for 8 hours, allowing volatile components to evaporate off. The sample was heat cured on a hot plate at 80° C. for 1 hour and at 130° C. for 1 hour, then allowed to cool down to room temperature. The cured film was stripped from the aluminum cup, and a specimen of 15 mm×5 mm was punched out (thickness about 150 μm).

| Analyzer: | thermomechanical analyzer TMA7000 (ULVAC-Riko, Inc.) |
| --- | --- |
| Temperature range: | 25° C. to 150° C. |
| Ramp: | 5° C./min |
| Load: | 5 g |
| Atmosphere: | air |
| Measurement: | 3 times, values in the temperature range of 35-45° C. averaged |

(3) Initial Film Appearance
A cured film of the coating composition in a single film form was visually observed for outer appearance.

(4) Film Transparency
A film was measured for haze by a haze meter NDH2000 (Nippon Denshoku Industries Co., Ltd.).

(5) Initial Adhesion
The coated substrate was examined for adhesion by a cross-hatch adhesion test according to JIS K5400, specifically by scribing the sample with a razor along 6 longitudinal and 6 transverse lines at a spacing of 2 mm to define 25 square sections, tightly attaching adhesive tape (commercially available) thereto, rapidly pulling back the adhesive tape at an angle of 90°, and counting the number (X) of coating sections kept unpeeled. The result is expressed as X/25.

(6) Appearance and Adhesion after Water Immersion
The coated substrate was immersed in boiling water for 2 hours, after which it was visually observed for appearance and examined for adhesion by the adhesion test (5).

(7) Mar Resistance
Mar resistance was analyzed according to ASTM D1044 by mounting a Taber abrasion tester with wheels CS-10F, measuring a haze after 500 turns under a load of 500 g, and calculating a haze difference (ΔHz, %) before and after the test.

(8) Weather Resistance
A weathering test was carried out by Eyesuper UV tester (Iwasaki Electric Co., Ltd.) which operated one cycle of [black panel temperature 63° C., humidity 50% RH, illuminance 50 mW/cm$^2$, raining intervals of 10 sec/hour for 5 hours] and [black panel temperature 30° C., humidity 95% RH for 1 hour]. The test was continued for 250 hours and 500 hours. A yellowing index (YI) was measured according to JIS K7103 before and after the test, from which a change of yellowing index (ΔYI) was computed. The weathered sample was also examined for cracks and delamination with naked eyes or under a microscope (250× magnifying power).

[Crack]
The film appearance after the weathering test was rated according to the following criterion.
  ○: intact
  Δ: some cracks
  x: cracks on entire film

[Delamination]
The film after the weathering test was rated according to the following criterion.
  ○: intact
  Δ: some delamination
  x: overall delamination

TABLE 3

Formulation (as solids) of coating composition and tested properties of film

| Formulation (pbw) | | Example 1 | 2 | 3 | 4 | 5 |
|---|---|---|---|---|---|---|
| (B) | Vinyl copolymer containing alkoxysilyl and UV-absorbing groups | B-1 100 | B-2 100 | B-3 100 | B-1 100 | B-1 100 |
| (A) | (Surface-coated) composite zinc oxide nanoparticle dispersion | A-1 18 | A-2 10 | A-1 40 | A-1 33 | A-2 20 |
| (D) | Colloidal silica | | D-1 5 | | | |
| (E) | Organopolysiloxane | | | | | E-1 30 |
| Additives | | | UVA-1 3 Water 0.5 | POL-1 5 | HALS-1 1 | |
| Test results | | | | | | |
| Dispersion stability | | ○ | ○ | ○ | ○ | ○ |
| CE (×10⁻⁶/° C.) | | 41.8 | 60.8 | 33.4 | 38.9 | 25.4 |
| Initial appearance | | intact | intact | intact | intact | intact |
| Initial haze | | 0.5 | 0.3 | 1.6 | 0.8 | 0.8 |
| Initial adhesion | | 25/25 | 25/25 | 25/25 | 25/25 | 25/25 |
| Appearance after water immersion | | intact | intact | intact | intact | intact |
| Adhesion after water immersion | | 25/25 | 25/25 | 25/25 | 25/25 | 25/25 |
| Mar resistance, % | | 17 | 15 | 12 | 14 | 10 |
| Weathering test 250 hr | ΔYI | <1 | <1 | <1 | <1 | <1 |
| | Crack | ○ | ○ | ○ | ○ | ○ |
| | De-lamination | ○ | ○ | ○ | ○ | ○ |
| Weathering test 500 hr | ΔYI | 4 | 6 | 3 | 3 | 5 |
| | Crack | ○ | ○ | ○ | ○ | ○ |
| | De-lamination | ○ | ○ | ○ | ○ | ○ |

TABLE 4

Formulation (as solids) of coating composition and tested properties of film

| Formulation (pbw) | | Comparative Example 1 | 2 | 3 | 4 | 5 |
|---|---|---|---|---|---|---|
| (B) | Vinyl copolymer containing alkoxysilyl and UV-absorbing groups | B-1 100 | B-1 100 | B-1 100 | RB-1 100 | RB-2 100 |
| (A) | (Surface-coated) composite zinc oxide nanoparticle dispersion | RA-1 18 | RA-2 18 | RA-3 18 | A-1 30 | A-1 30 |
| (D) | Colloidal silica | | | | | |
| Additives | | | | | | |
| Test results | | | | | | |
| Dispersion stability | | ○ | X | ○ | ○ | ○ |
| CE (×10⁻⁶/° C.) | | 58.3 | 43.5 | 47.2 | 36.1 | 122.1 |
| Initial appearance | | intact | whitened | intact | intact | slightly whitened |
| Initial haze | | 0.2 | 4.5 | 0.9 | 0.7 | 2.2 |
| Initial adhesion | | 25/25 | 25/25 | 25/25 | 25/25 | 25/25 |
| Appearance after water immersion | | intact | faintly milky | faintly milky | intact | intact |
| Adhesion after water immersion | | 25/25 | 25/25 | 25/25 | 25/25 | 10/25 |
| Mar resistance, % | | 19 | 22 | 25 | 7 | 20 |
| Weathering test 250 hr | ΔYI | 8 | 6 | 2 | 1 | 2 |
| | Crack | X | Δ | Δ | ○ | ○ |
| | De-lamination | Δ | Δ | ○ | ○ | X |
| Weathering test 500 hr | ΔYI | — | — | 5 | 9 | — |
| | Crack | — | — | X | Δ | — |
| | De-lamination | — | — | Δ | X | — |

Examples 6-9 and Comparative Examples 6-10

The coating composition within the scope of the invention was coated and cured to form a film as a primer. A colloidal silica-laden organopolysiloxane composition was coated and cured onto the cured film. The film laminate was similarly tested.

Prior to coating, each of the coating compositions formulated in accordance with the formulation (solids basis) of Tables 5 and 6 was diluted with a 20/80 (weight ratio) solvent mixture of diacetone alcohol and propylene glycol monomethyl ether to a total solids concentration of 10%. The coating solution was applied onto a cleaned surface of a 0.5 mm polycarbonate resin substrate (Iupilon Sheet, Mitsubishi Engineering-Plastics Corp.) by dip coating and heat cured at 120° C. for 60 minutes to form a film of about 6-8 μm thick.

A mixture of colloidal silica-laden organopolysiloxane composition HC-1 or 2 in Synthesis Example 5 or 6, and an additive like UV absorber (UVA-1 or 2) was applied onto the film by dip coating and heat cured at 120° C. for 60 minutes to form a silicone film of about 2-3 μm thick. The film laminate was tested for physical properties, with the results also shown in Tables 5 and 6.

TABLE 5

Formulation (as solids) and tested properties of film laminate

| Formulation (pbw) | | Example 6 | 7 | 8 | 9 |
|---|---|---|---|---|---|
| (B) | Vinyl copolymer containing alkoxysilyl and UV-absorbing groups | B-1 100 | B-2 100 | B-3 100 | B-1 100 |
| (A) | (Surface-coated) composite zinc oxide nanoparticle dispersion | A-1 18 | A-2 10 | A-1 40 | A-2 26 |
| (D) | Colloidal silica | | D-1 10 | | |
| Additives | | | UVA-1 3 | POL-1 5 | HALS-1 1 E-1 3 |
| Colloidal silica-laden organopolysiloxane composition | | HC-2 100 | HC-1 100 | HC-2 100 | HC-2 100 |
| Additives | | | UVA-2 2 | | F-1 5 |
| Test results | | | | | |
| Dispersion stability | | ○ | ○ | ○ | ○ |
| Initial appearance | | intact | intact | intact | intact |
| Initial haze | | 0.5 | 0.3 | 0.9 | 0.7 |

TABLE 5-continued

Formulation (as solids) and tested properties of film laminate

| | | Example | | | |
|---|---|---|---|---|---|
| Formulation (pbw) | | 6 | 7 | 8 | 9 |
| Initial adhesion | | 25/25 | 25/25 | 25/25 | 25/25 |
| Appearance after water immersion | | intact | intact | intact | intact |
| Adhesion after water immersion | | 25/25 | 25/25 | 25/25 | 25/25 |
| Mar resistance, % | | 4 | 5 | 2 | 4 |
| Weathering test 250 hr | ΔYI | <1 | <1 | <1 | <1 |
| | Crack | ○ | ○ | ○ | ○ |
| | Delamination | ○ | ○ | ○ | ○ |
| Weathering test 500 hr | ΔYI | 4 | 6 | 3 | 3 |
| | Crack | ○ | ○ | ○ | ○ |
| | Delamination | ○ | ○ | ○ | ○ |

TABLE 6

Formulation (as solids) and tested properties of film laminate

| | | Comparative Example | | | | |
|---|---|---|---|---|---|---|
| Formulation (pbw) | | 6 | 7 | 8 | 9 | 10 |
| (B) Vinyl copolymer containing alkoxysilyl and UV-absorbing groups | | B-1 100 | B-1 100 | B-1 100 | RB-1 100 | RB-2 100 |
| (A) (Surface-coated) composite zinc oxide nanoparticle dispersion | | RA-1 20 | RA-2 20 | RA-3 20 | A-1 10 | A-2 15 |
| (D) Colloidal silica | | | | | D-1 5 | |
| Additives | | | | | | |
| Colloidal silica-laden organopolysiloxane composition | | HC-1 100 | HC-1 100 | HC-1 100 | HC-2 100 | HC-2 100 |
| Additives | | UVA-2 2 | UVA-2 2 | UVA-2 2 | | |
| Test results | | | | | | |
| Dispersion stability | | ○ | X | ○ | ○ | ○ |
| Initial appearance | | intact | whitened | intact | intact | slightly whitened |
| Initial haze | | 0.4 | 3.9 | 1.1 | 0.6 | 1.8 |
| Initial adhesion | | 25/25 | 25/25 | 25/25 | 25/25 | 25/25 |
| Appearance after water immersion | | intact | faintly milky | intact | intact | milky |
| Adhesion after water immersion | | 25/25 | 10/25 | 25/25 | 25/25 | 5/25 |
| Mar resistance, % | | 3 | 2 | 4 | 3 | 3 |
| Weathering test 250 hr | ΔYI | 3 | 8 | 2 | 6 | 2 |
| | Crack | X | Δ | ○ | ○ | ○ |
| | Delamination | Δ | X | ○ | X | X |
| Weathering test 500 hr | ΔYI | — | — | 9 | — | — |
| | Crack | — | — | X | — | — |
| | Delamination | — | — | Δ | — | — |

Japanese Patent Application Nos. 2009-095169 and 2010-051511 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A UV-shielding coating composition, comprising:
   (A) a dispersion in a dispersing medium of composite zinc oxide nanoparticles, wherein
   the composite zinc oxide nanoparticles are obtained by coating surfaces of zinc oxide nanoparticles with at least one member selected from the group consisting of oxides and hydroxides of Al, Si, Zr and Sn, and further surface treating said coated surfaces of zinc oxide nanoparticles with at least one member selected from the group consisting of a hydrolyzable silane and a partial hydrolytic condensate of a hydrolysable silane, said hydrolysable silane having formula (1):

$(R^1)_x(R^2)_y Si(X')_{4-x-y}$ (1)

wherein $R^1$ and $R^2$ are each independently hydrogen or a substituted or unsubstituted monovalent hydrocarbon group, X' is a halogen atom, $C_1$-$C_3$ alkoxy group, $C_1$-$C_3$ acyloxy group or isocyanate group, x is 0 or 1, y is 0, 1 or 2, and x+y is 0, 1, 2 or 3, wherein said zinc oxide nanoparticles, from which the composite zinc oxide nanoparticles in dispersion (A) are derived, have been prepared by heating and vaporizing a zinc source in direct current arc plasma, oxidizing the zinc vapor, and cooling, said dispersion has a photocatalytic degradability of up to 25%, wherein the photocatalytic degradability (PD) is determined by adding the dispersion to a methylene blue solution, irradiating black light to the methylene blue solution for 12 hours, measuring the absorbance of the solution at 653 nm before and after the black light irradiation, and calculating according to:

$PD(\%) = [(A0-A)/A0] \times 100$ wherein A0 is the initial absorbance and A is the absorbance after the black light irradiation, (B) a vinyl copolymer consisting of a copolymer of
   (b-1) 1 to 50% by weight of an alkoxysilyl-containing vinyl monomer, (b-2) 5 to 40% by weight of a UV-absorbing vinyl monomer, and (b-3) 35 to 90% by weight of a (meth)acrylic monomer selected from the group consisting of a (meth)acrylic acid ester of a monohydric alcohol, a (meth)acrylic acid ester of an alkoxy(poly)alkylene glycol, a mono(meth)acrylic acid ester of a polyol, a poly(meth)acrylic acid ester of a polyol, a (poly)ester of a non-polymerizable polybasic acid with a hydroxyalkyl(meth)acrylate, and an epoxy-containing (meth)acrylate, and (C) an organic solvent, wherein the dispersing medium is at least one member selected from the group consisting of an alcohol, an ester, a ketone, a glycol ether, an aromatic hydrocarbon, and a saturated hydrocarbon, and wherein the solids content of composite zinc oxide nanoparticle dispersion (A) being 1 to 50% by weight based on the solids content of vinyl copolymer (B).

2. The composition of claim 1, wherein the composite zinc oxide nanoparticles in dispersion (A) have an average particle size (volume average particle size $D_{50}$) of 10 to 200 nm.

3. The composition of claim 1, further comprising (D) colloidal silica.

4. The composition of claim 1, further comprising (E) an organopolysiloxane having a weight average molecular weight of at least 1,000, represented by the general formula (5):

$$(R)_a Si(Y)_b O_{(4-a-b)/2} \quad (5)$$

wherein R is each independently a substituted or unsubstituted monovalent $C_1$-$C_{18}$ hydrocarbon group other than amino-containing monovalent hydrocarbon group, Y is each independently selected from the group consisting of hydroxyl, $C_1$-$C_3$ alkoxy groups, $C_2$-$C_4$ alkoxyalkoxy groups, $C_1$-$C_6$ acyloxy groups, $C_1$-$C_6$ alkenoxy groups, and isocyanate groups, a and b are numbers in the range: $0 \leq a < 2$, $0 < b < 3$, and $0 < a+b < 4$.

5. The composition of claim 1, further comprising a UV absorber and/or UV stabilizer.

6. The composition of claim 1, wherein component (b-2) is a benzotriazole compound having the general formula (3):

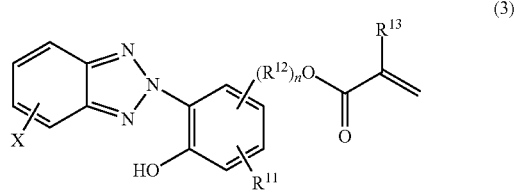

wherein X is hydrogen or chlorine, $R^{11}$ is hydrogen, methyl or $C_4$-$C_8$ tertiary alkyl group, $R^{12}$ is a straight or branched $C_2$-$C_{10}$ alkylene group, $R^{13}$ is hydrogen or methyl, and n is 0 or 1, or a benzophenone compound having the general formula (4):

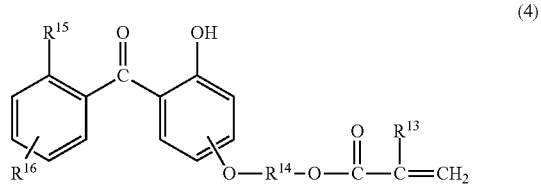

wherein $R^{13}$ is as defined above, $R^{14}$ is a substituted or unsubstituted, straight or branched $C_2$-$C_{10}$ alkylene group, $R^{15}$ is hydrogen or hydroxyl, and $R^{16}$ is hydrogen, hydroxyl or $C_1$-$C_6$ alkoxy group.

7. The composition of claim 1, which is used as a primer for a silicon base hard coating.

8. The composition of claim 7, wherein the silicon base hard coating is a cured film of a composition comprising (a) a silicone resin obtained from (co)hydrolytic condensation of at least one member selected from alkoxysilanes and partial hydrolytic condensates thereof, said alkoxysilane having the general formula (2):

$$(R^3)_m (R^4)_n Si(OR^5)_{4-m-n} \quad (2)$$

wherein $R^3$ and $R^4$ are each independently hydrogen or a substituted or unsubstituted monovalent hydrocarbon group, substituents may bond together, $R^5$ is a $C_1$-$C_3$ alkyl group, and m and n are independently 0 or 1 and m+n is 0, 1 or 2, (b) colloidal silica, (c) a curing catalyst, and (d) a solvent.

9. A coated article comprising a substrate and a cured film of the UV-shielding coating composition of claim 1 disposed on at least one surface of the substrate directly or via at least one layer.

10. The coated article of claim 9 wherein the substrate is an organic resin substrate.

11. The composition of claim 1, wherein the composite zinc oxide nanoparticles are obtained by coating surfaces of zinc oxide nanoparticles with at least one member selected from the group consisting of oxides and hydroxides of Al, Zr and Sn, and further surface treating said coated surfaces of zinc oxide nanoparticles with at least one member selected from the group consisting of a hydrolyzable silane and a partial hydrolytic condensate of a hydrolyzable silane, said hydrolyzable silane having formula (1):

$$(R^1)_x (R^2)_y Si(X')_{4-x-y} \quad (1)$$

wherein $R^1$ and $R^2$ are each independently hydrogen or a substituted or unsubstituted monovalent hydrocarbon group, X' is a halogen atom, $C_1$-$C_3$ alkoxy group, $C_1$-$C_3$ acyloxy group or isocyanate group, x is 0 or 1, y is 0, 1 or 2, and x+y is 0, 1, 2 or 3, wherein said zinc oxide nanoparticles, from which the composite zinc oxide nanoparticles in dispersion (A) are derived, have been prepared by heating and vaporizing a zinc source in direct current arc plasma, oxidizing the zinc vapor, and cooling.

12. The composition of claim 1, wherein the composite zinc oxide nanoparticles are obtained by coating surfaces of zinc oxide nanoparticles with at least one member selected from the group consisting of oxides and hydroxides of Si, and further surface treating said coated surfaces of zinc oxide nanoparticles with at least one member selected from the group consisting of a trialkoxysilane and a partial hydrolytic condensate of a trialkoxysilane, wherein said zinc oxide nanoparticles, from which the composite zinc oxide nanoparticles in dispersion (A) are derived, have been prepared by heating and vaporizing a zinc source in direct current arc plasma, oxidizing the zinc vapor, and cooling.

* * * * *